(12) United States Patent
Sekita et al.

(10) Patent No.: US 6,616,287 B2
(45) Date of Patent: *Sep. 9, 2003

(54) OPTICAL ELEMENT

(75) Inventors: Makoto Sekita, Yokohama (JP);
Fumiaki Kumagai, Ushiku (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/201,794

(22) Filed: Dec. 1, 1998

(65) Prior Publication Data
US 2002/0041453 A1 Apr. 11, 2002

(30) Foreign Application Priority Data

Dec. 2, 1997 (JP) ............................................. 9-331997
Nov. 11, 1998 (JP) ........................................... 10-320950

(51) Int. Cl.[7] ................................................ G02B 5/10
(52) U.S. Cl. ....................... 359/858; 359/633; 359/861; 359/727; 359/834
(58) Field of Search ................................ 359/834, 858, 359/859, 861, 633, 727, 631, 730, 731, 857; 29/527.1, 527.2, 527.3

(56) References Cited

U.S. PATENT DOCUMENTS

| 3,674,334 A | 7/1972 | Offner ........................ 350/294 |
| 4,265,510 A | 5/1981 | Cook ............................ 350/55 |
| 4,406,045 A * | 9/1983 | Schwab ...................... 29/527.1 |
| 4,737,021 A | 4/1988 | Korsch ........................ 350/505 |
| 4,775,217 A | 10/1988 | Ellis ............................ 350/538 |
| 5,063,586 A | 11/1991 | Jewell et al. .................. 378/34 |
| 5,241,419 A * | 8/1993 | Pratt et al. ................... 359/633 |
| 5,715,091 A * | 2/1998 | Meyers ....................... 359/565 |
| 5,790,311 A * | 8/1998 | Togino ........................ 359/633 |
| 5,917,662 A | 6/1999 | Sekita ......................... 359/729 |
| 5,995,287 A * | 11/1999 | Sekita ......................... 359/599 |
| 6,021,004 A | 2/2000 | Sekita et al. ................. 359/676 |
| 6,166,866 A | 12/2000 | Kimura et al. ............... 359/729 |
| 6,301,064 B1 * | 10/2001 | Araki et al. ................. 359/834 |

FOREIGN PATENT DOCUMENTS

| JP | 2-297516 | 12/1990 |
| JP | 10-68884 | 3/1998 |

* cited by examiner

*Primary Examiner*—Euncha Cherry
(74) *Attorney, Agent, or Firm*—Fitzpatrick, Cella, Harper & Scinto

(57) ABSTRACT

This invention has as its object to prevent deterioration of optical performance by suppressing the respective reflection surfaces from being decentered relative to each other in an optical element formed by placing a plurality of reflection surfaces having curvatures at neighboring positions. In order to achieve this object, an optical element according to this invention has a first reflection surface block formed by placing a plurality of reflection surfaces having curvatures at neighboring positions, and a second reflection surface block which faces the first reflection surface block, and is formed by placing one or more reflection surfaces at neighboring positions, and the first and second reflection surface blocks are formed by a metal mold.

13 Claims, 34 Drawing Sheets

FIG. 17

[ NUMERICAL DATA ]

HORIZONTAL HALF FIELD ANGLE    26.3
VERTICAL HALF FIELD ANGLE    20.3
STOP DIAMETER    1.80

IMAGE SIZE        HORIZONTAL 4.8mm × VERTICAL 3.6mm

| i | $Y_i$ | $Z_i$ | $\theta_i$ | $D_i$ | $N_{di}$ | $\nu_{di}$ | |
|---|---|---|---|---|---|---|---|
| 1 | 0.00 | 0.00 | 0.00 | 10.50 | 1 | | STOP |
| 2 | 0.00 | 10.50 | 18.50 | 9.72 | 1 | | REFLECTION SURFACE |
| 3 | −5.85 | 2.74 | 0.00 | 9.33 | 1 | | REFLECTION SURFACE |
| 4 | −11.46 | 10.20 | −17.00 | 8.84 | 1 | | REFLECTION SURFACE |
| 5 | −11.93 | 1.37 | −26.00 | 9.40 | 1 | | REFLECTION SURFACE |
| 6 | −19.63 | 6.76 | −27.50 | 10.52 | 1 | | REFLECTION SURFACE |
| 7 | −19.63 | −3.76 | −0.00 | | 1 | | IMAGE PLANE |

SPHERICAL SHAPE
   R1 SURFACE    ∞
   R7 SURFACE    ∞

ASPHERICAL SHAPE
   R2 SURFACE    a    = −1.03246e+01    b    = −1.34560e+01    t    = 2.14129e+01
                   C03 = −2.04227e−04    C21 = −2.51960e−04
                   C04 = 3.87920e−05    C22 = 7.82883e−05    C40 = 7.37251e−05

R3 SURFACE    a    = −3.76378e+00    b    = 1.15057e+01    t    = −4.84582e+01
                   C03 = −4.23088e−03    C21 = −8.66026e−03
                   C04 = 2.66095e−04    C22 = 6.67233e−04    C40 = −1.76369e−03

R4 SURFACE    a    = −1.35088e+01    b    = −2.23714e+01    t    = 3.34756e+01
                   C03 = 1.70083e−04    C21 = 4.10341e−04
                   C04 = −2.16933e−05    C22 = −2.29569e−05    C40 = −2.33923e−05

R5 SURFACE    a    = −1.15360e+01    b    = 1.59489e+01    t    = −7.40307e+01
                   C03 = −5.32622e−04    C21 = −1.39995e−03
                   C04 = −1.03391e−04    C22 = −1.12407e−04    C40 = −3.23217e−04

R6 SURFACE    a    = −8.60889e+00    b    = 3.12909e+01    t    = 3.61581e+01
                   C03 = −1.44317e−04    C21 = 2.41581e−04
                   C04 = 5.92462e−05    C22 = 7.48678e−05    C40 = −9.38832e−05

FIG. 28

[ NUMERICAL DATA ]

HORIZONTAL HALF FIELD ANGLE  31.7
VERTICAL HALF FIELD ANGLE  24.8
STOP DIAMETER  2.0

IMAGE SIZE  HORIZONTAL 4mm × VERTICAL 3mm

| i | Yi | Zi | θi | Di | Ndi | νdi | |
|---|------|-------|--------|------|--------|-------|-------------------|
| 1 | 0.00 | 0.00 | 0.00 | 1.82 | 1 | | STOP |
| 2 | 0.00 | 1.82 | 0.00 | 7.49 | 1.58310 | 30.20 | REFRACTION SURFACE |
| 3 | 0.00 | 9.30 | 18.49 | 9.86 | 1.58310 | 30.20 | REFLECTION SURFACE |
| 4 | −5.93 | 1.43 | 3.23 | 9.30 | 1.58310 | 30.20 | REFLECTION SURFACE |
| 5 | −10.65 | 9.44 | −12.55 | 8.90 | 1.58310 | 30.20 | REFLECTION SURFACE |
| 6 | −11.50 | 0.58 | −22.91 | 9.39 | 1.58310 | 30.20 | REFLECTION SURFACE |
| 7 | −18.82 | 6.46 | −25.63 | 8.02 | 1.58310 | 30.20 | REFLECTION SURFACE |
| 8 | −18.82 | −1.56 | −0.01 | 3.68 | 1 | | REFRACTION SURFACE |
| 9 | −18.82 | −5.24 | −0.01 | 0.00 | 1 | | IMAGE PLANE |

SPHERICAL SHAPE
  R1 SURFACE   ∞
  R2' SURFACE  −7.648
  R8 SURFACE   10.757
  R9 SURFACE   ∞

ASPHERICAL SHAPE

R3' SURFACE  $a$ = −1.09716e+01   $b$ = −1.25390e+01   $t$ = 2.15145e+01
  $C_{02}$ = 0                  $C_{20}$ = 0
  $C_{03}$ = 6.87152e−05        $C_{21}$ = −1.21962e−04
  $C_{04}$ = 3.59209e−05        $C_{22}$ = 1.02173e−04   $C_{40}$ = 4.95588e−05

R4' SURFACE  $a$ = −2.34468e+00   $b$ = 4.88786e+00    $t$ = −3.56094e+01
  $C_{02}$ = 0                  $C_{20}$ = 0
  $C_{03}$ = −4.48049e−03       $C_{21}$ = −7.45433e−03
  $C_{04}$ = 1.81003e−03        $C_{22}$ = 2.09229e−03   $C_{40}$ = −8.28024e−04

R5' SURFACE  $a$ = −6.11985e+00   $b$ = 1.70396e+01    $t$ = −2.17033e+01
  $C_{02}$ = 0                  $C_{20}$ = 0
  $C_{03}$ = −3.23467e−04       $C_{21}$ = −1.07985e−03
  $C_{04}$ = −3.70249e−05       $C_{22}$ = −1.74689e−04  $C_{40}$ = −1.21908e−04

R6' SURFACE  $a$ = ∞              $b$ = ∞              $t$ = 0
  $C_{02}$ = 0                  $C_{20}$ = 0
  $C_{03}$ = 1.10097e−03        $C_{21}$ = −3.73963e−04
  $C_{04}$ = −1.59596e−04       $C_{22}$ = −3.22152e−04  $C_{40}$ = −1.74291e−04

R7 SURFACE   $a$ = −2.11332e+01   $b$ = −1.31315e+03   $t$ = 1.70335e+00
  $C_{02}$ = 0                  $C_{20}$ = 0
  $C_{03}$ = 8.29145e−05        $C_{21}$ = −1.11374e−03
  $C_{04}$ = −2.50522e−05       $C_{22}$ = −5.28330e−05  $C_{40}$ = −2.91711e−05

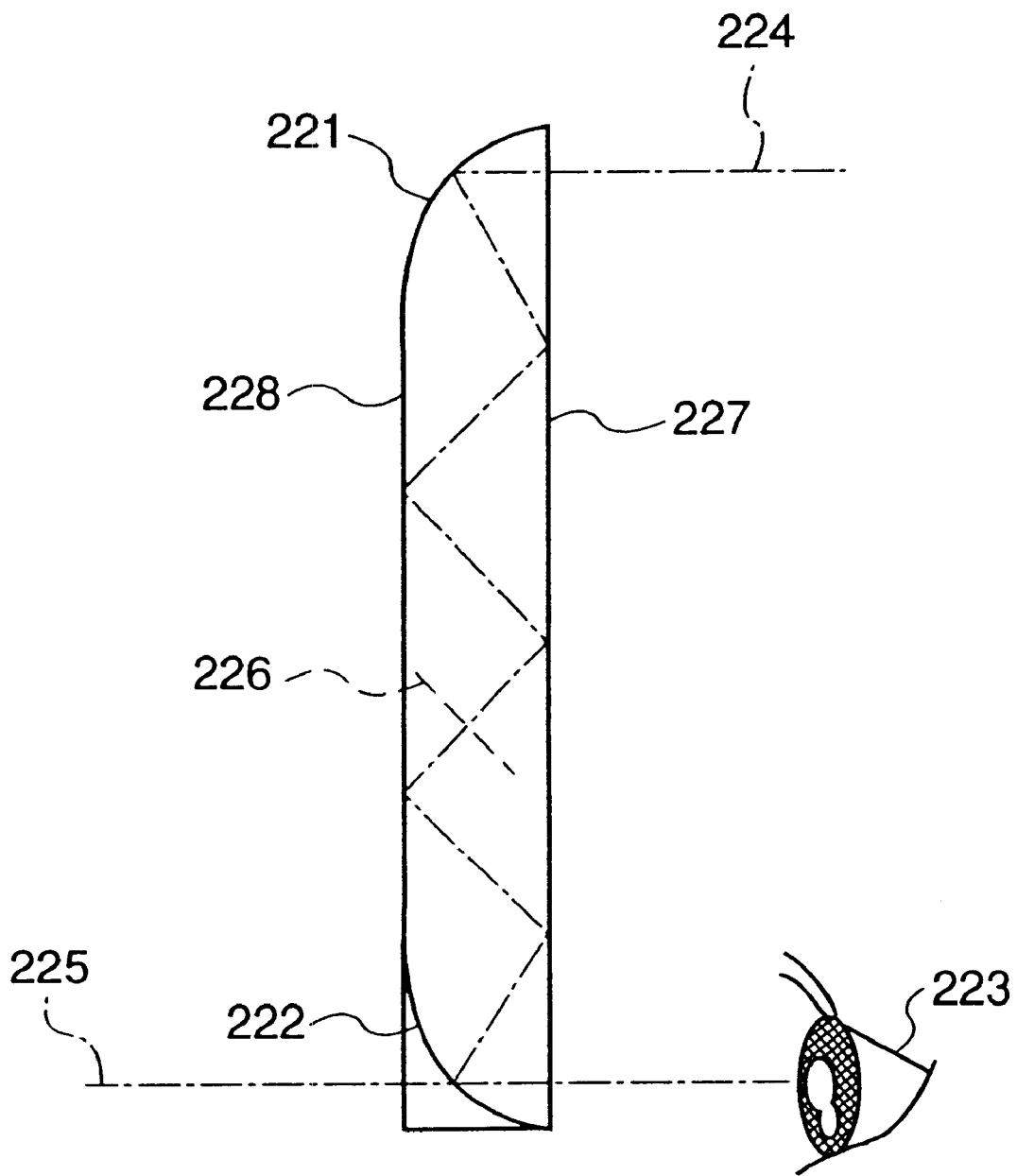

OPTICAL ELEMENT

BACKGROUND OF THE INVENTION

The present invention relates to an optical element to be used in a video camera, still video camera, copying machine, and the like and, more particularly, to an optical element having a plurality of reflection surfaces with curvatures.

Conventionally, as a photographing optical system including a reflection surface, for example, a so-called mirror lens system is known, as shown in FIG. 29.

Referring to FIG. 29, object light 174 is converged and reflected toward the object side by a concave mirror 171, and is imaged on an image plane 173. This mirror lens system is based on the arrangement of a so-called Cassegrain reflecting telescope, and aims at a small total lens length by folding the optical path of a telescopic lens system with a large total lens length using two opposing reflection mirrors.

In the objective lens system of a telescope as well, many systems for shortening the total optical length using a plurality of reflection mirrors are known in addition to the Cassegrain type. That is, the optical path is efficiently folded by using a reflection mirror in a lens system with a large total lens length, thus obtaining a compact optical system.

However, in general, in the Cassegrain reflecting telescope, some object light rays are eclipsed by a concave mirror 172.

This problem arises from the fact that a chief ray 176 of the object light 174 is located on an optical axis 175. In order to solve this problem, many mirror optical systems which separate the chief ray 176 of the object light 174 from the optical axis 175 by using a reflection mirror at a decentered position have been proposed.

As the methods of separating the chief ray of object light from the optical axis, a method using a portion of a reflection mirror which is rotation-symmetric to the optical axis, as disclosed in, e.g., U.S. Pat. Nos. 3,674,334, 4,737,021, and the like, and a method of decentering the central axis itself of the reflection mirror from the optical axis, as disclosed in U.S. Pat. Nos. 4,265,510, 5,063,586, and the like, are available.

FIG. 30 shows an example of U.S. Pat. No. 3,674,334 as an example of the method of using a portion of a rotation-symmetric reflection mirror.

Referring to FIG. 30, a concave mirror 181, convex mirror 182, and concave mirror 183 are originally rotation-symmetric to an optical axis 184, as indicated by the two-dashed chain lines. However, since the concave mirror 181 uses only its portion above the optical axis 184, the convex mirror 182 uses only its portion below the optical axis 184, and the concave mirror 183 uses only its portion below the optical axis 184, the chief ray of object light 185 can be separated from the optical axis 184, and the object light 185 can be output without being eclipsed.

FIG. 31 shows an example of U.S. Pat. No. 5,063,586 as an example of the method of decentering the central axis itself of the reflection mirror from the optical axis.

Referring to FIG. 31, when an axis perpendicular to an object plane 191 is defined as an optical axis 197, the central coordinates and central axes of the surfaces of a convex mirror 192, concave mirror 193, convex mirror 194, and concave mirror 195 are decentered from the optical axis 197, and object light 198 can be efficiently imaged on an image plane 196 without being eclipsed by the reflection mirrors by appropriately setting the decentering amounts and the radii of curvature of the respective surfaces.

In this way, when the reflection mirrors that construct the mirror optical system are decentered, object light can be prevented from being eclipsed. However, since the individual reflection mirrors must be set with different decentering amounts, a structure for attaching the respective reflection mirrors is complicated, and it is very hard to assure high attachment precision.

As one method of solving this problem, for example, when a mirror system is formed as one block, assembly errors of optical parts upon assembly can be avoided. Conventionally, as optical systems having a large number of reflection surfaces as one block, for example, optical prisms such as a pentagonal roof prism, Porro prism, and the like, which are used in camera finder systems, a color-separation prism for separating a light beam coming from a photographing lens into three, red, green, and blue light beams, and imaging object images based on the respective color light beams on the corresponding imaging element surfaces, and the like are known.

The function of a pentagonal roof prism popularly used in a single-lens reflex camera as an example of the optical prism will be explained below with reference to FIG. 32.

Referring to FIG. 32, reference numeral 201 denotes a photographing lens; 202, a quick return mirror; 203, a focal plane; 204, a condenser lens; 205, a pentagonal roof prism; 206, an eyepiece; 207, the pupil of the observer; 208, an optical axis; and 209, an image plane.

Light rays coming from an object (not shown) are transmitted through the photographing lens 201, are reflected upward in the camera by the quick return mirror 202, and are imaged on the focal plane 203 located at a position equivalent to the image plane 209.

Behind the focal plane 203, the condenser lens 204 for imaging the exit pupil of the photographing lens 201 on the pupil 207 of the observer is placed. Behind the condenser lens 204, the pentagonal roof prism 205 for converting an object image on the focal plane 203 into an erected image is placed.

An object image defined by object light that enters the pentagonal roof prism 205 via an entrance surface 205a is horizontally inverted by a roof surface 205b. The object light is then reflected by a reflection surface 205c toward the observer.

The object light reflected toward the observer side is transmitted through an exit surface 205d of the pentagonal roof prism 205, and reaches the eyepiece 206, which converts the object light into nearly collimated light by its refractive power. The nearly collimated light beam then reaches the pupil 207 of the observer, and the observer can observe the object image.

As a major problem of such optical prisms represented by the pentagonal roof prism, harmful ghost light is likely to be produced due to irregular incoming light into the prism from positions and angles other than those of effective light rays.

In the pentagonal roof prism with the above-mentioned structure, ghost light that enters the prism at an angle different from that of effective light rays, as indicated by the arrow in FIG. 32, is reflected in turn by the roof surface 205b and reflection surface 205c, is totally reflected by the entrance surface 205a, and then leaves the prism from the lower portion of the exit surface 205d toward the observer.

If such ghost light is produced, since its number of times of reflection is different from that of normal effective light rays, a vertically inverted image appears on the lower side of the observation frame.

In order to remove the ghost light, a light-shielding groove 200 is formed on the exit surface 205d of the pentagonal room prism 205.

By painting the entire prism surface except for the entrance surface 205a and exit surface 205d in black, a reflection film deposited on the roof surface 205b and reflection surface 205c is protected from environmental changes in, e.g., temperature, humidity, and the like, and light rays coming from outside the prism are intercepted. Since such optical prism has a plurality of reflection surfaces that are integrally formed, the respective reflection surfaces have a very accurate relative positional relationship, and do not require any positional adjustment.

Note that the principal function of such prism is to invert an image by changing the direction the light rays travel, and the individual reflection surfaces are defined by planes.

By contrast, optical prisms, the reflection surfaces of which have curvatures, are disclosed in, e.g., U.S. Pat. No. 4,775,217 and Japanese Patent Laid-Open No. 2-297516.

U.S. Pat. No. 4,775,217 relates to the structure of an eyepiece in an observation optical system. In the structure of this article, as shown in FIG. 33, display light 215 coming from an information display member 211 is reflected toward the object side by a reflection surface 212, and reaches a surface 213 having a curvature that defines a concave surface.

The concave surface 213 converts the display light 215 as divergent light from the information display member 211 into nearly collimated light by its power, and guides it to a pupil 214 of the observer, thus making the observer see a displayed image.

In the structure of this article, an object image can be seen as well as observation of the displayed image.

Object light 216 enters a surface 217 nearly parallel to the reflection surface 212, and reaches the concave surface 213. Since a semi-transparent film, for example, is deposited on the concave surface 213, some light components of the object light 216 are transmitted through the concave surface 213, and some other light components are reflected thereby. The transmitted object light 216 is transmitted through the reflection surface 212 and reaches the pupil 214 of the observer. In this way, the observer can observe the object light 216 and display light 215, which are superposed each other. Also, Japanese Patent Laid-Open No. 2-297516 also relates to the structure of an eyepiece in an observation optical system. In the structure of this article, as shown in FIG. 34, display light 224 originating as collimated light from an information display member (not shown) is transmitted through a flat surface 227, and becomes incident on a parabolic surface 221.

The parabolic surface 221 focuses the display light 224 to form an image on a focal plane 226.

At this time, since the focused display light 224 reaches the focal plane 226 while being totally reflected between the flat surface 227 and a flat surface 228 parallel to this surface 227, a low-profile structure of the entire optical system is realized.

The display light 224 coming from the focal plane 226 as divergent light becomes incident on a parabolic surface 222 while being totally reflected between the flat surfaces 227 and 228. The parabolic surface 222 converts the display light 224 into nearly collimated light and guides it to a pupil 223 of the observer, thus making the observer recognize a displayed image.

In this article, the observer can also see an object image as well as observation of the displayed image by the structure similar to that of U.S. Pat. No. 4,775,217.

Since such optical prisms having reflection surfaces with curvatures normally suffer more optical performance deterioration resulting from decentering of each reflection surface than an optical prism constructed by flat surfaces alone, the allowable positional precision for each reflection surface is very strict. However, U.S. Pat. No. 4,775,217 and Japanese Patent Laid-Open No. 2-297516 do not mention any of the adjustment method, assembly method, manufacturing method, and the like of the respective reflection surfaces to compensate for the positional precision of each reflection surface.

On the other hand, as the number of reflection surfaces of an optical prism increases, the decentering amounts of the respective reflection surfaces accumulate due to aberration correction of the optical prism. Hence, the allowable decentering amount per reflection surface becomes smaller and stricter with increasing number of reflection surfaces. For this reason, a method of accurately compensating for the positional precision of each reflection surface is demanded.

Furthermore, these optical prisms are manufactured by molding using a metal mold to meet recent low-cost requirements.

For example, a pentagonal roof prism, which was conventionally manufactured by polishing a glass block, is formed by molding using a metal mold as a so-called hollow pentagonal prism, in which the reflection surfaces 205b and 205c shown in FIG. 32 are formed by reflection mirrors, and are integrally formed with a hollow prism. Upon forming the hollow pentagonal prism by molding, since the reflection mirrors are formed by flat surfaces alone, the imaging performance of the finder system does not deteriorate irrespective of slight positional deviations of the reflection mirrors.

However, when an optical prism having reflection surfaces with curvatures is formed by molding, a metal mold which assures higher positional precision of each reflection surface than the optical prism constructed by flat surfaces alone is required.

Also, when an optical prism having reflection surfaces with curvatures is formed by molding, a metal mold structure, which can cope with a complicated optical prism integrally formed with a plurality of reflection surfaces with curvatures, which are set at decentered positions, is demanded.

SUMMARY OF THE INVENTION

The present invention has been made in consideration of the aforementioned problems, and has as its object to suppress relative decentering of reflection surfaces, which must have highest precision, and to prevent optical performance from deteriorating, in an optical element in which a plurality of reflection surfaces with curvatures are placed and formed adjacent to each other.

It is another object of the present invention to increase the degree of freedom in aberration correction of an optical element, and to improve the imaging performance of the optical element.

It is still another object of the present invention to accurately set the spacing between reflection surface blocks at predetermined positions while facilitating the manufacture of the respective reflection surface blocks.

It is still another object of the present invention to prevent effective light rays in an optical element from being eclipsed.

It is still another object of the present invention to reduce the number of parts, to reduce errors produced upon movement of an optical element, and to prevent effective light rays in an optical element from being eclipsed.

It is still another object of the present invention to obtain a low-cost optical element, which can be formed by molding irrespective of its shape to have reflection surfaces at accurate positions.

It is still another object of the present invention to obtain an optical element which suffers less ghost.

It is still another object of the present invention to allow the directions of light rays that enter and leave an optical element to be set arbitrarily.

In order to solve the above-mentioned problems and to solve the objects, the first aspect of an optical element according to the present invention is characterized by the following arrangement.

That is, there is provided an optical element comprising a first reflection surface block formed by placing a plurality of reflection surfaces having curvatures at neighboring positions, and a second reflection surface block which opposes the first reflection surface block, and is formed by placing one or a plurality of reflection surfaces at neighboring positions, wherein the first and second reflection surface blocks are formed by a metal mold.

Also, the second aspect of an optical element according to the present invention is characterized by the following arrangement.

That is, there is provided an optical element wherein a first reflection surface group including a plurality of reflection surfaces having curvatures placed at neighboring positions, and a second reflection surface group which opposes the first reflection surface group and includes one or a plurality of reflection surfaces having curvatures placed at neighboring positions, are formed on surfaces of a transparent member, and the transparent member is formed by a metal mold.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 17 shows numerical value data in the actual design example;

FIG. 28 shows numerical value data in the actual design example;

FIG. 34 is an explanatory view of another observation optical system.

DETAILED DESCRIPTION OF THE PREFERRED EMBODIMENTS

The preferred embodiments of the present invention will be described hereinafter. Prior to the detailed description of the embodiments, a method of expressing numerical data of each embodiment, and items common to all the embodiments will be explained.

Figure 1:
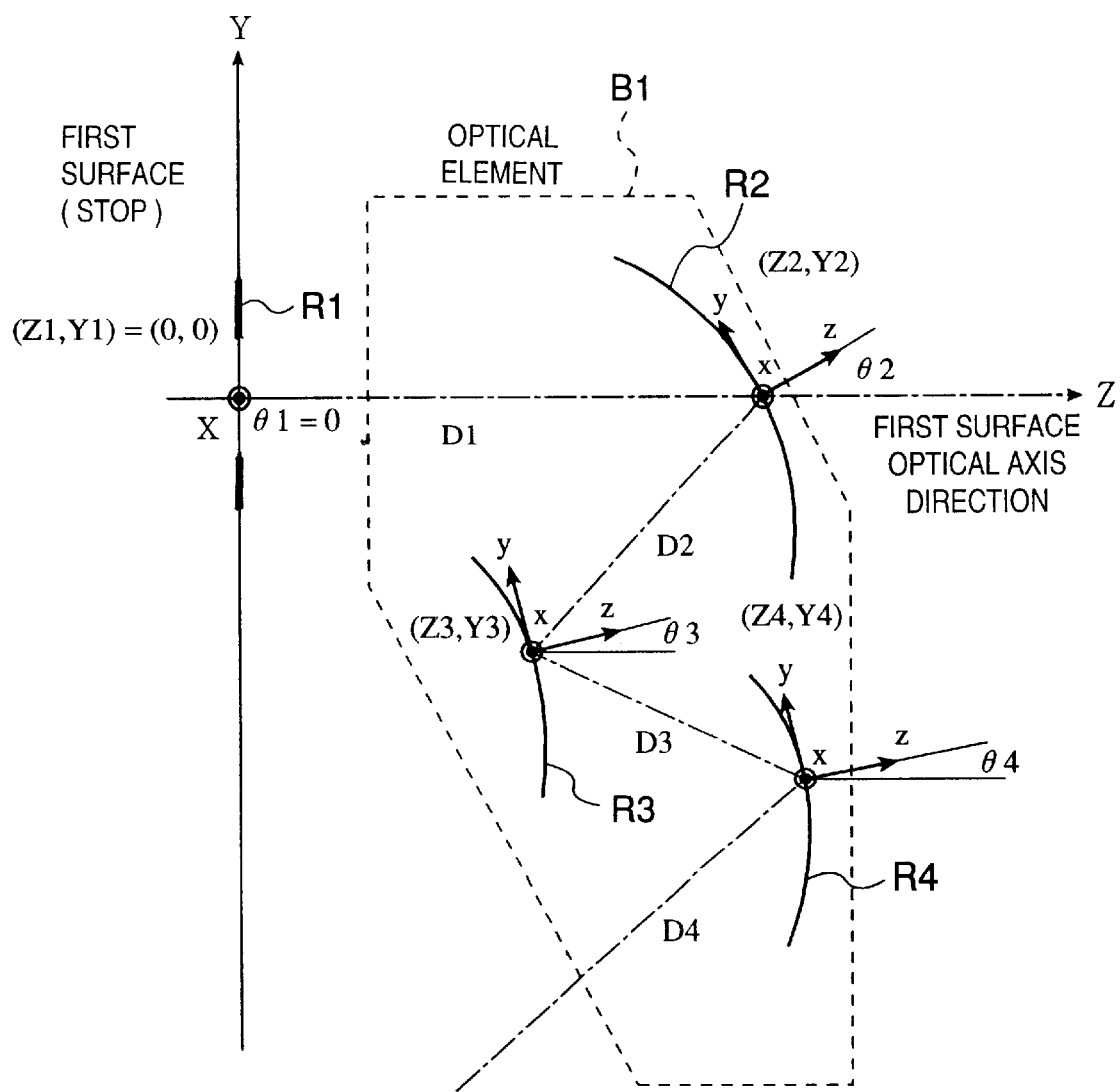
FIG. 1 is a graph for explaining the coordinate system that indicates the positions and tilts of refraction or reflection surfaces of the respective optical components in the present invention.

FIG. 1 is an explanatory view of the coordinate system which defines numerical data of an optical system according to the present invention. In each embodiment of the present invention, a surface placed at an i-th position along one light ray (indicated by the one-dashed chain line in FIG. 1 and will be referred to as a reference axis light ray hereinafter), which travels from the object side toward an image plane, will be referred to as an i-th surface.

Referring to FIG. 1, a first surface R1 is a stop, a second surface R2 is a reflection surface which has a tilt with respect to the first surface R1, and third and fourth surfaces R3 and R4 are reflection surfaces, which have shifts and tilts with respect to their immediately preceding surfaces. These reflection surfaces construct an optical element B1.

Since the optical system of the present invention is a decentering optical system, the respective surfaces that construct the optical system do not have any common optical axis. For this reason, in each embodiment of the present invention, an absolute coordinate system, which has as its origin the center of the light ray effective diameter of the first surface, is set.

In each embodiment of the present invention, the central point of the light ray effective diameter of the first surface is set as the origin, and the path of a light ray (reference axis light ray) which passes through the origin and the center of a final image plane is defined as a reference axis of the optical system. Furthermore, the reference axis in each embodiment of the present invention has a direction (sense). The direction agrees with that the reference axis light ray travels upon imaging.

In each embodiment of the present invention, the reference axis of the optical system is set as mentioned above. However, in the method of determining the reference axis of the optical system, an axis which is convenient for optical design, aberration correction, or expression of the respective surface shapes that construct the optical system, may be used.

In general, however, a path in which a light ray (reference axis light ray), which passes through the central point of the first surface of the optical system and reaches the center of the final image plane, is reflected by reflection surfaces is set as the reference axis. The order of the respective surfaces is the one in which the reference axis light ray undergoes reflection.

Hence, the reference axis finally reaches the center of the image plane while changing its direction according to a law of reflection in the predetermined order of the respective surfaces.

All tilt surfaces that construct the optical system of each embodiment of the present invention basically have tilts in an identical plane. For this reason, the respective axes of the absolute coordinate system are defined as follows:

Z-axis: a reference axis which passes through the origin and extends to the second surface R2

Y-axis: a straight line which passes through the origin, and makes 90° counterclockwise with the Z-axis in a tilt plane (in the plane of paper of FIG. 1)

X-axis: a straight line which passes through the origin, and is perpendicular to the Z- and Y-axes (a straight line perpendicular to the plane of paper of FIG. 1)

In order to express the shape of an i-th surface that forms the optical system, it is easy to recognize the shape by setting a local coordinate system which has as an origin the intersection between the reference axis and i-th surface, and expressing the surface shape of that surface by the local coordinate system, rather than by expressing the surface shape using the absolute coordinate system. For this reason, in an embodiment that displays numerical data of the present invention, the surface shape of the i-th surface is expressed by the local coordinate system.

The tilt angle of the i-th surface in a Y-Z plane is expressed by an angle $\theta i$ (°), which is positive in the counterclockwise direction with respect to the Z-axis of the absolute coordinate system. Hence, in each embodiment of the present invention, the origin of the local coordinate system of each surface is located on the Y-Z plane in FIG. 1.

No surface decentering is present in the X-Z and X-Y planes. Furthermore, the y- and z-axes of the local coordinate system (x, y, z) of the i-th surface have a tilt of an angle $\theta i$ with the absolute coordinate system (X, Y, Z) in the Y-Z plane, and are set as follows.

z-axis: a straight line which passes through the origin of the local coordinate system, and makes an angle $\theta i$ counterclockwise with the Z-direction of the absolute coordinate system in the Y-Z plane y-axis: a straight line which passes through the origin of the local coordinate system, and makes 90° counterclockwise with the z-direction in the Y-Z plane x-axis: a straight line passes through the origin of the local coordinate system, and is perpendicular to the Y-Z plane.

Also, Di is the scalar quantity that represents the spacing between the origins of the local coordinate systems of the i-th and (i+1)-th surfaces, and Ndi and Vdi are respectively the refractive index and Abbe's number of a medium between the i-th and (i+1)-th surfaces.

Each embodiment of the present invention has a spherical surface and a rotation-asymmetric aspherical surface. Of these surfaces, the spherical shape of the spherical portion is expressed by a radius Ri of curvature. The radius Ri of curvature has a minus sign when the center of curvature is present on the first surface side along the reference axis (one-dashed chain line in FIG. 1) which extends from the first surface toward the image plane, and has a plus sign when the center of curvature is present on the image plane side.

Note that the spherical surface has a shape given by:

$$z = \frac{(x^2+y^2)/Ri}{1+\{1-(x^2+y^2)/Ri^2\}^{1/2}}$$

The optical system of the present invention has at least one rotation-asymmetric aspherical surface, the shape of which is given by:

$$z = A/b + C02y^2 + C20_x{}^2 + C03y^3 + C21_x{}^2y + C04y^4 + C22_x{}^2y^2 + C40_x{}^4$$

for $$A = (a+b) \cdot (y^2 \cdot \cos^2 t + x^2)$$

$$B = 2a \cdot b \cdot \cos t \left[ 1 + \left\{(b-a) \cdot y \cdot \sin\left(\frac{t}{2a}\right) \cdot b\right\} + \left[ 1 + \left\{(b-a) \cdot y \cdot \sin\left(\frac{t}{a \cdot b}\right)\right\} \right] - \right.$$

-continued $$\{y^2/(a \cdot b)\} - \{4a \cdot b \cdot \cos^2 t + (a+b)^2 \sin^2 t\} \frac{x^2}{4a^2 b^2 \cos^2 t}\Big]^{1/2}\Big]$$

Since the above curved surface formula includes terms of even orders alone for x, a curved surface defined by the above curved surface formula has a plane-symmetric shape having the y-z plane as the plane of symmetry. Furthermore, when the following condition is satisfied, the curved surface has a shape symmetrical about the x-z plane:

$C_{03}=C_{21}=t=0$

Otherwise, the curved surface has a rotation-asymmetric shape.

Moreover, when the following condition is satisfied, the curved surface has a rotation-symmetric shape:

$C_{02}=C_{20}, C_{04}=C_{40}=C_{22}/2$

In each embodiment of the present invention, as shown in FIG. 1, the first surface (the incidence side of the optical system) is the stop. Also, a horizontal half field angle uY is the maximum field angle of a light beam which enters the stop R1 in the Y-Z plane in FIG. 1. The diameter of the stop as the first surface is presented as the stop diameter.

This relates to the brightness of the optical system. Note that the stop diameter is equal to the entrance pupil diameter since the entrance pupil is located on the first surface.

Furthermore, the effective image range on the image plane is presented as an image size. The image size is expressed by a rectangular region, the horizontal and vertical sizes of which are expressed by those in the y- and x-directions of the local coordinate system.

First Embodiment

The first embodiment of the present invention will be described below.

Figure 2:
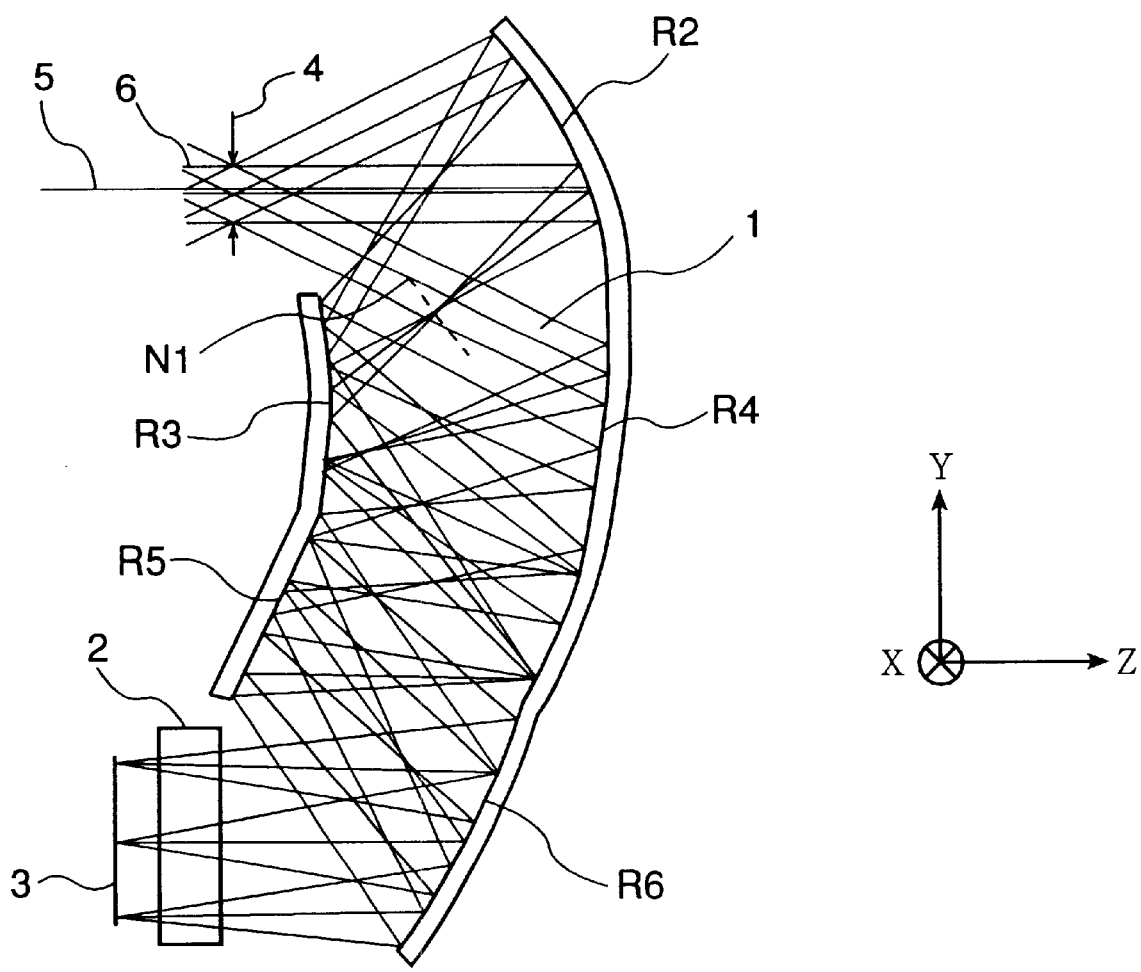
FIG. 2 is an optical path section view for explaining the first embodiment of the present invention.

FIG. 2 is an optical path sectional view of the first embodiment. Reference numeral 1 denotes an example of an optical element which is integrally formed with a plurality of reflection surfaces having curvatures and, more specifically, an optical element which has five reflection surfaces, i.e., a concave mirror R2, convex mirror R3, concave mirror R4, convex mirror R5, and concave mirror R6 in turn from the object side. The reference axis that enters the optical element 1 and the reference axis that leaves the optical element 1 are parallel and have opposite sense. Reference numeral 2 denotes an optical correction plate such as a quartz low-pass filter, infrared cut filter, or the like; 3, an imaging element surface such as a CCD; 4, a stop placed on the object side of the optical element 1; and 5, a reference axis of a photographing optical system.

The imaging relationship in this embodiment will be explained below. Light 6 coming from an object is incident on the concave mirror R2 of the optical element 1 after its amount is limited by the stop 4.

The concave mirror R2 reflects the object light 6 toward the convex mirror R3, and forms a primary object image on an intermediate image plane N1 by its power.

In this manner, since the object image is formed in the optical element 1 in an early stage, an increase in light ray effective diameter of the surface placed on the image side of the stop 4 can be suppressed.

The object light 6 that forms a primary image on the intermediate image plane N1 forms an image on the imaging element surface 3 while being repetitively reflected by the convex mirror R3, concave mirror R4, convex mirror R5, and concave mirror R6, and being influenced by the powers of these reflection mirrors.

In this fashion, the optical element 1 serves as a lens unit which has desired optical performance and positive power as a whole while repeating reflections at the plurality of reflection mirrors having curvatures.

Figure 3:
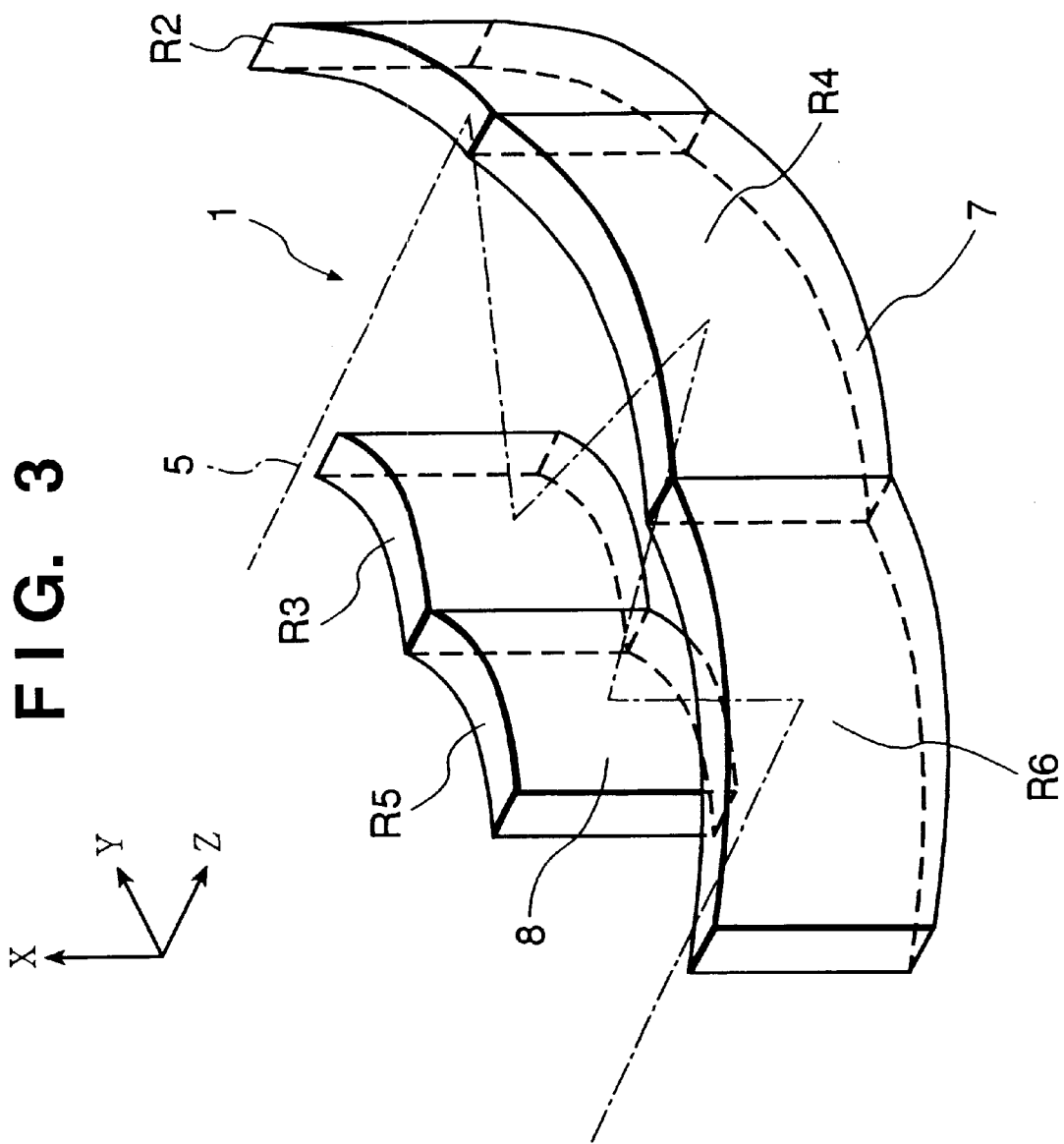
FIG. 3 is a perspective view of an optical element of the first embodiment.

FIG. 3 is a perspective view of the optical element shown in FIG. 2.

The same reference numerals in FIG. 3 denote the same parts as in FIG. 1.

In this embodiment, the optical element 1 is formed by placing reflection surface blocks, each of which integrates a plurality of neighboring reflection surfaces having curvatures, at opposing positions.

Referring to FIG. 3, the concave mirror R2 as the first reflection surface of the optical element 1, the concave mirror R4 as the third reflection surface, and the concave mirror R6 as the fifth reflection surface construct a first reflection surface block 7, which integrates three reflection surfaces.

The convex mirror R3 as the second reflection surface of the optical element 1, and the convex mirror R5 as the fourth reflection mirror, which oppose the first refection surface block 7, construct a second reflection surface block 8, which integrates two reflection surfaces. The first and second reflection surface blocks 7 and 8 form the optical element 1.

In this way, using the reflection surface blocks each of which integrates neighboring reflection surfaces placed at decentered positions, the assembly time can be shortened and layout errors upon assembly can be reduced as compared to the individual reflection surfaces which must be placed at predetermined decentered positions, since the integrated reflection surface blocks need only be placed at predetermined positions.

When the reflection surfaces of each reflection surface block are integrally formed using a metal mold, high positional precision and surface precision of the individual reflection surfaces can be guaranteed irrespective of production quantities, and high positional precision of the reflection mirrors, which is hard to attain in the conventional system, can be easily assured.

In this case, the first and second reflection surface blocks 7 and 8 may be formed either integrally or separately using a metal mold. However, in consideration of a process of forming a reflection film on each reflection surface by deposition, sputtering, dipping, or the like after formation of each reflection surface block, it is preferable to form the reflection surface blocks separately, and combine the first and second reflection surface blocks 7 and 8 after the reflection film is formed on each reflection surface by deposition, sputtering, dipping, or the like.

Figure 4:
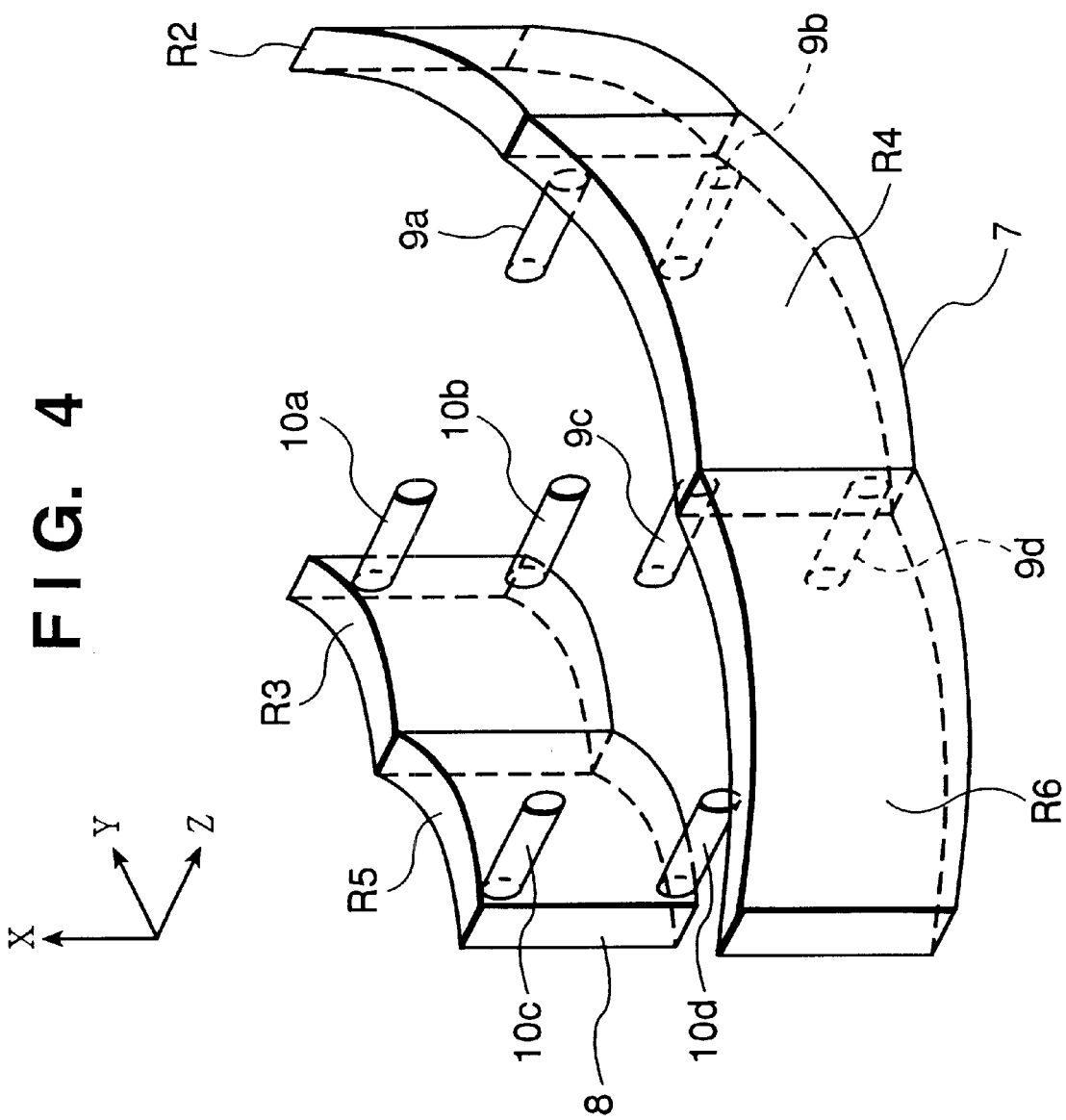
FIG. 4 is a perspective view for explaining the method of assembling a reflection surface block of the first embodiment.

As a method of combining the first and second reflection surface blocks 7 and 8, which are separately formed using a metal mold, as shown in, e.g., FIG. 4, columns 9a to 9d which extend from the first reflection surface block 7 toward the second reflection surface block 8 at positions where they do not eclipse effective light rays of the optical element 1, and columns 10a to 10d which extend from the second reflection surface block 8 toward the first reflection surface block 7 at positions where they do not eclipse effective light rays of the optical element 1 need only be joined to hold the spacing between the first and second reflection surface blocks 7 and 8 to be a design value. Alternatively, the distal end portions of the columns 9a to 9d on the first reflection surface block 7 may serve as nibs, and holes may be formed at the distal end portions of the columns 10a to 10d on the second reflection surface block 8, thus assembling the optical element 1 by coupling the nibs and holes.

These columns 9a to 9d and 10a to 10d are placed at predetermined positions on the reflection surface blocks. If these columns 9a to 9d and 10a to 10d are formed using a metal mold simultaneously with formation of the reflection surface blocks, the need for a process of attaching the columns 9a to 9d and 10a to 10d to the reflection surface blocks can be obviated. Hence, the number of parts can be reduced, and the manufacturing cost can also be reduced.

When the reflection surface blocks and columns are simultaneously formed using a metal mold, the length of each column can be managed at the precision of the metal mold, and the spacing between the opposing reflection surface blocks can be accurately held.

The columns are joined or coupled in a range outside the effective light rays of the optical element 1. However, light other than effective light rays may strike these columns and become ghost light.

To solve this problem, in this embodiment, for example, light-shielding grooves are formed on the columns 9a to 9d and 10a to 10d to reflect incoming light other than the effective light rays on the columns in directions other than the optical path, or the surface of each column is subjected to a blast process to diffuse incoming light on the column, thus preventing production of ghost light.

When the light-shielding grooves or blast-processed portions of the columns 9a to 9d and 10a to 10d are directly formed on the metal mold, a measure against ghost light can be taken simultaneously with formation of the reflection surface blocks.

Furthermore, when zooming or focusing is done using the optical element of this embodiment, a holding portion for fixing the optical element to a movable stage may be directly formed on the reflection surface block in consideration of movement of the optical element on the movable stage.

Figure 5:
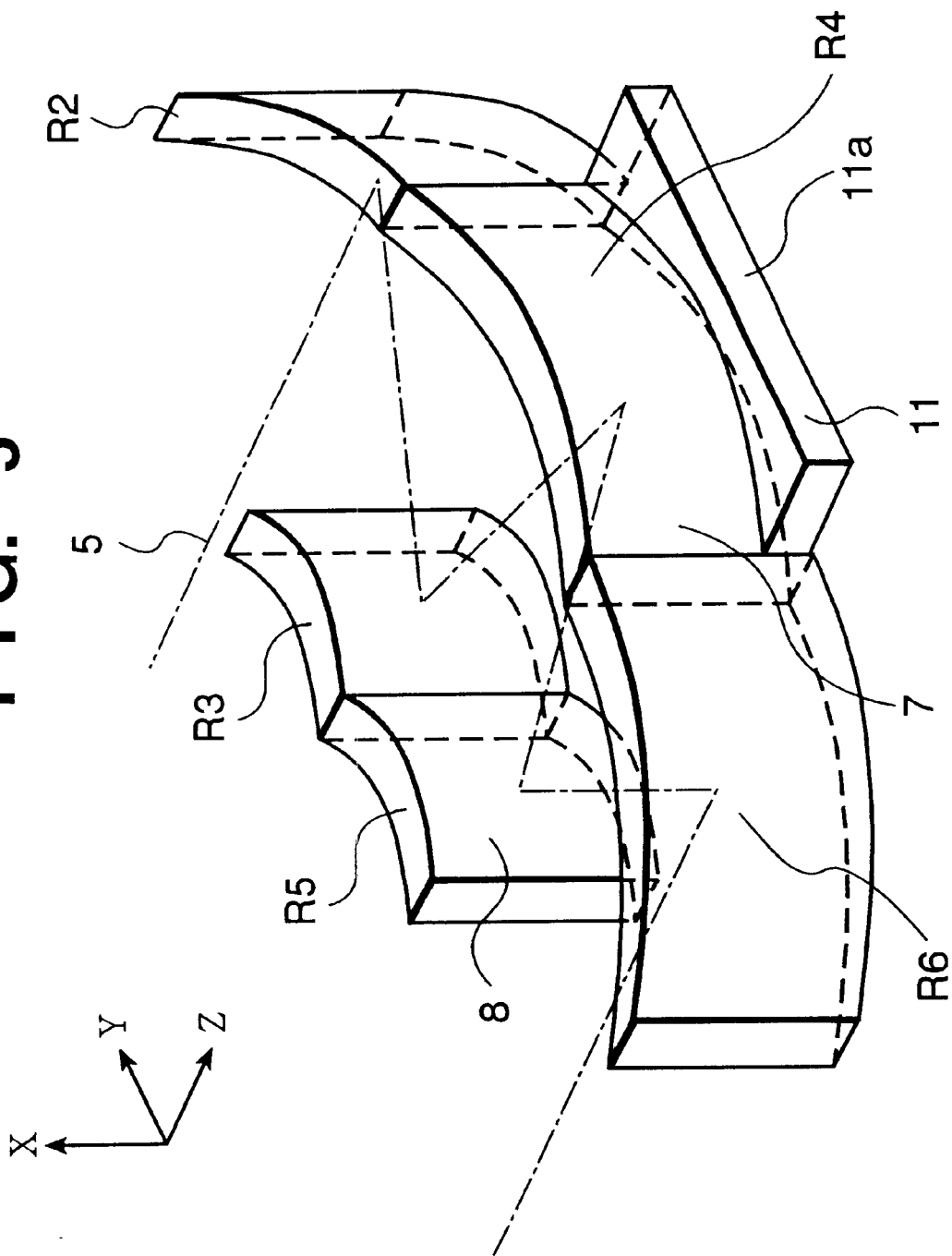
FIG. 5 is a perspective view for explaining the method of holding the reflection surface block of the first embodiment.

FIG. 5 shows an example of a holding portion for fixing formed on the first reflection surface block.

Referring to FIG. 5, a holding portion 11 is formed on the rear side of an effective reflection surface of the concave mirror R4 of the first reflection surface block 7, so that its bottom surface 11a extends in a direction parallel to a plane including the reference axis 5. Zooming or focusing is done by coupling this holding portion 11 to a movable stage (not shown) and moving that movable stage.

Since the plane including the reference axis 5 is parallel to the bottom surface 11a of the holding portion 11, the parallelism between the movable stage and optical element can be easily guaranteed by coupling the holding portion 11 and movable stage parallel to each other. For this reason, the influences of decentering and the like of the reference axis produced upon movement of the optical element can be removed, thus preventing deterioration of optical performance.

Note that the bottom surface 11a of the holding portion 11 preferably has a mirror surface. Furthermore, the surface roughness of the bottom surface 11a is preferably 0.08 μm or less (Rmax). If the bottom surface 11a is polished to a surface roughness of about 1 to 2 μm (Rmax), the peak portions of the three-dimensional surface may be destroyed or shaved to impair the parallelism with the plane including reference axis 5, thus posing the problem of decentering again.

As another example of zooming or focusing using the optical element of this embodiment, a method of forming holes on the reference surface blocks of the optical element, fitting a shaft into the holes, and moving the optical element along the shaft may be used.

Figure 6:
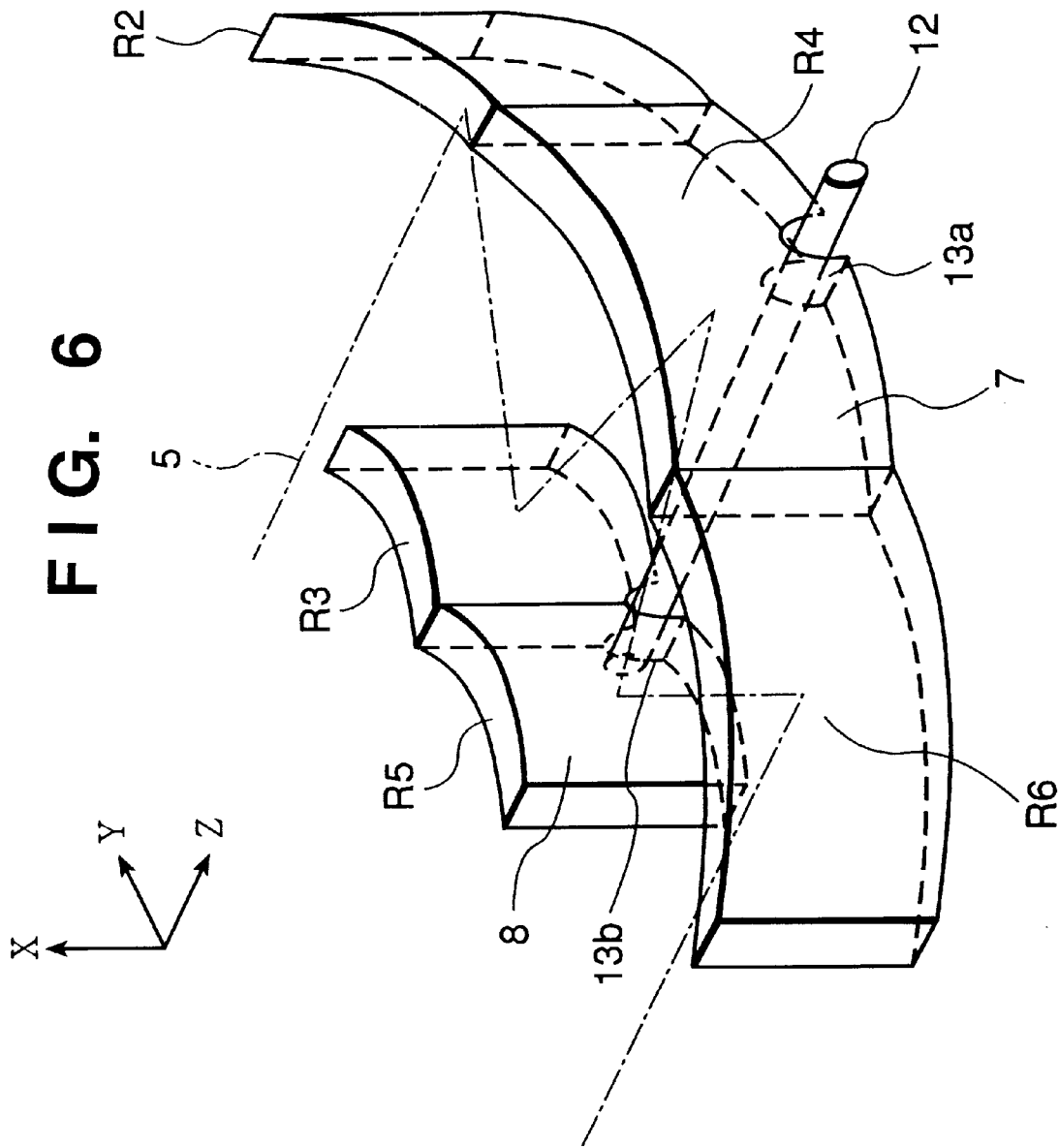
FIG. 6 is a perspective view for explaining another method of holding the reflection surface block of the first embodiment.

FIG. 6 shows an example in which through holes 13a and 13b that receive a shaft 12 are formed on the first and second reflection surface blocks 7 and 8.

Referring to FIG. 6, the holes 13a and 13b are formed on the first and second reflection surface blocks 7 and 8 at positions which have equal distances from the plane including the reference axis 5, and are separated from a light ray effective portion of each reflection surface.

Upon fitting the shaft 12 into these holes 13a and 13b, the plane including the reference axis 5 stays parallel to the shaft 12, and the shaft 12 can serve as a guide upon movement of the optical element, thus translating the optical element.

In FIG. 6, only one shaft 12 is used. However, many shafts may be used.

To restate, by forming a reflecting optical element using a metal mold, the reflecting optical element can have a plurality of functions, e.g., a holding function, light-shielding function, and the like, the number of parts and manufacturing cost can be reduced, and the functions and performance of the optical element can be improved.

Second Embodiment

The second embodiment will be explained below with reference to FIG. 7. In this embodiment, another reflection surface block, which does not face the first and second reflection surface blocks of the first embodiment, is added to change the directions the reference light ray that enters and leaves the optical element 1.

Figure 7:
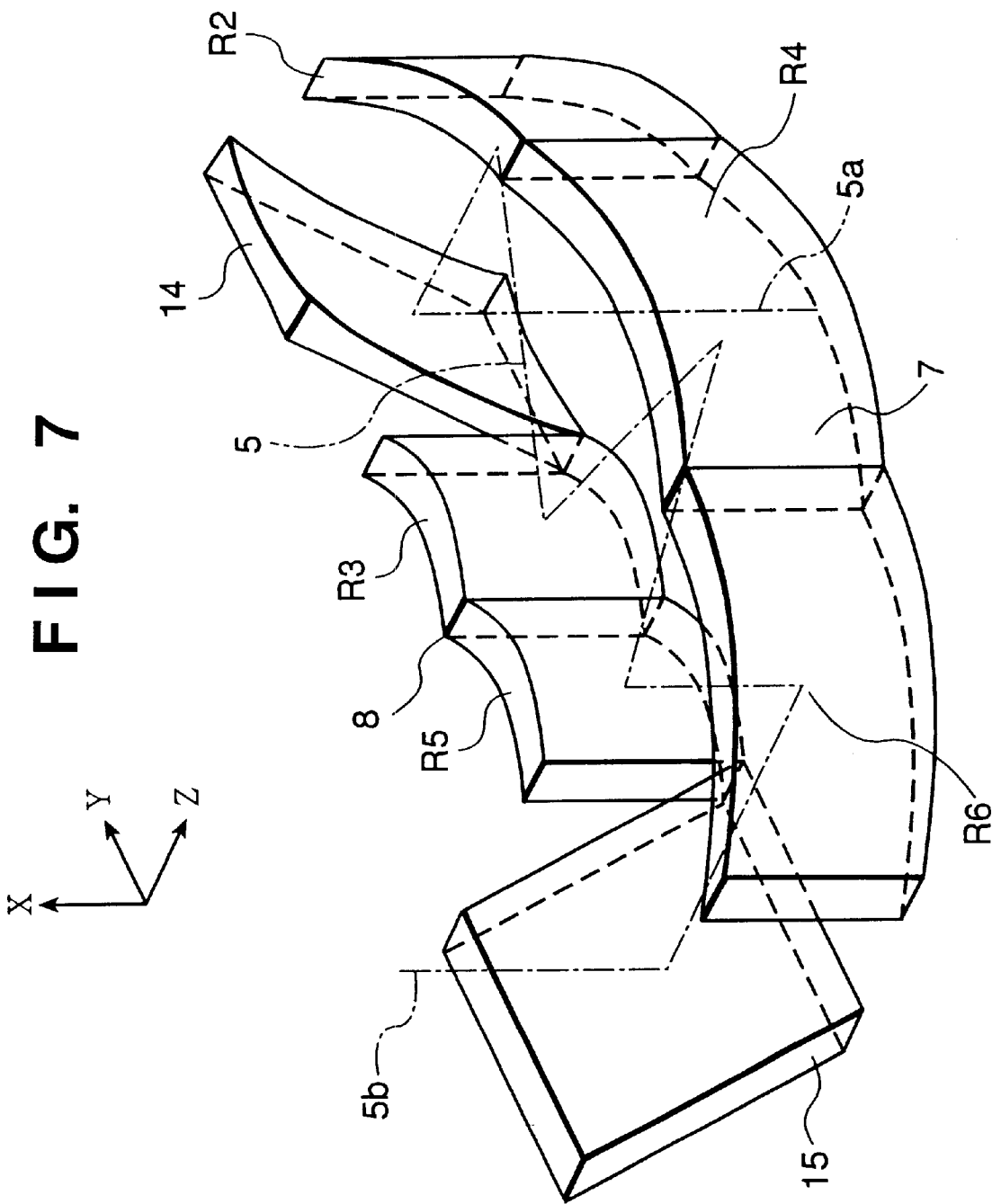
FIG. 7 is a perspective view for explaining the second embodiment of the present invention.

Referring to FIG. 7, a third reflection surface block 14 is placed next to the convex mirror R3 of the second reflection surface block 8, does not oppose the first and second reflection surface blocks 7 and 8, and has a tilt of around 45° with respect to the incidence reference axis to make a reference axis 5a, which enters from the +Z-axis direction in the first embodiment, enter from the −X-axis direction.

On the other hand, a fourth reflection surface block 15 is placed next to the convex mirror R5 of the second reflection surface block 8, does not oppose the first and second reflection surface blocks 7 and 8, and has a tilt of around 45° with respect to the incidence reference axis to make a reference axis 5b, which leaves in the −Z-axis direction in the first embodiment, leave in the +X-axis direction.

In this embodiment, since the optical system is built by only reflection surfaces in contrast to a conventional system in which reflection mirrors are inserted in a refraction lens system to change the angle of light rays, the third and fourth reflection surface blocks which do not face the first and second reflection surface blocks, are added, and have curvatures, thus easily changing the directions a light ray enters and leaves the optical element, while correcting aberrations.

In this embodiment, the reflection surface blocks which neighbor the first and second reflection surface blocks may be formed simultaneously with formation of the first and second reflection surface blocks.

For example, since the third reflection surface block neighbors the second reflection surface block, it may be formed using the metal mold for the second reflection surface block.

Of course, after the third reflection surface block is formed independently of the second reflection surface block, it may be coupled or joined to the second reflection surface block.

In this fashion, by adding another reflection surface block, which does not oppose the first and second reflection surface blocks, the entrance and exit directions of the reference axis light ray can be freely set. In a camera using the optical element of this embodiment, since the entrance and exit directions can be freely set, size and thickness reductions of the camera can be attained due to a decrease in dead space, and a camera having a shape that has never been seen before can be achieved.

Third Embodiment

The third embodiment of the present invention will be described with reference to FIG. 8. In this embodiment, refraction members are placed next to the first and second reflection surface blocks.

Figure 8:
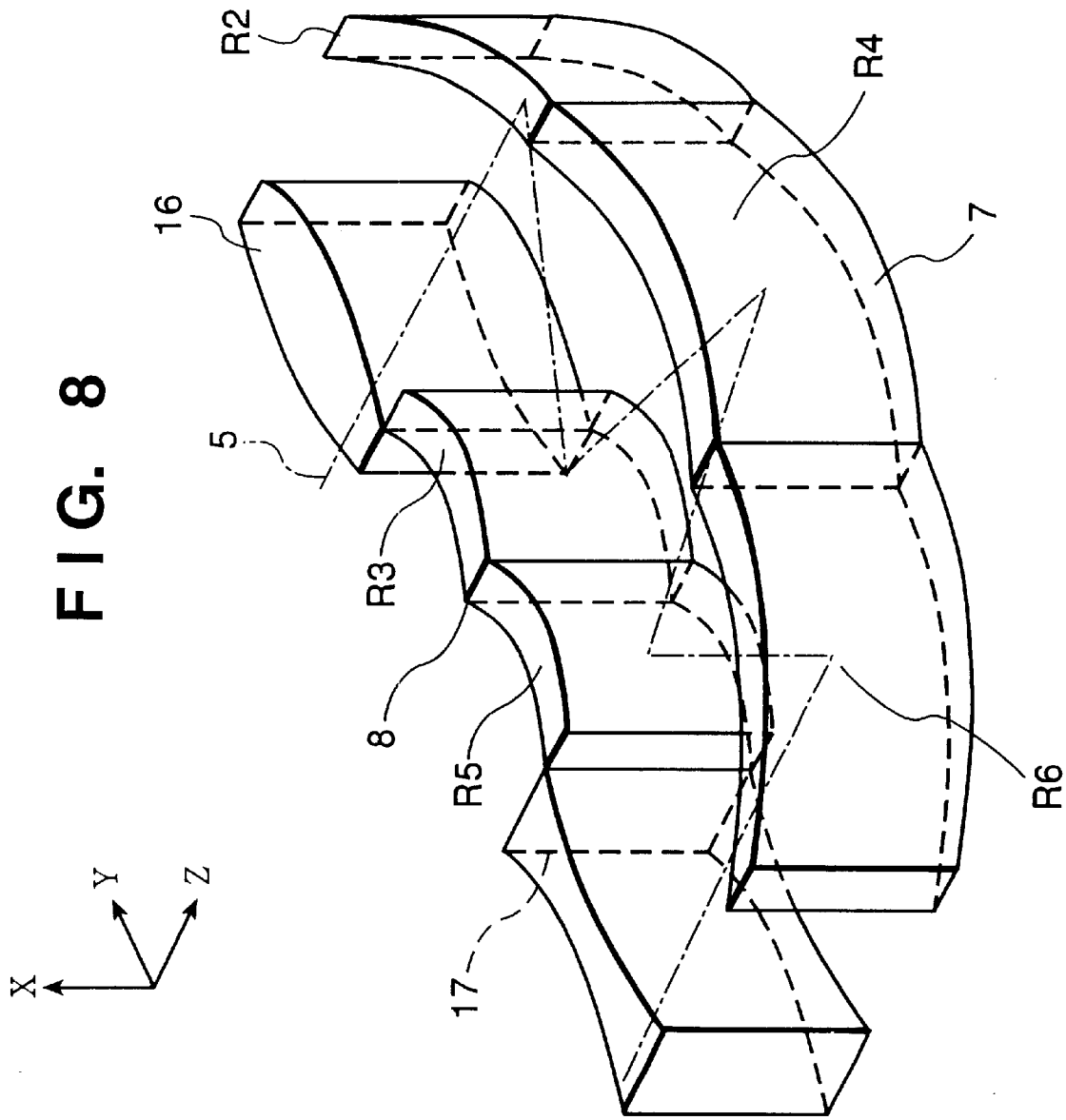
FIG. 8 is a perspective view for explaining the third embodiment of the present invention.

Referring to FIG. 8, a refraction member 16 is placed next to the convex mirror R3 side of the second reflection surface block 8 in the first embodiment, and has a positive refractive power.

On the other hand, a refraction member 17 is placed next to the convex mirror R5 of the second reflection surface block 8, and has a negative refractive power.

In this embodiment, by appropriately placing the refraction members and reflection members, a design that utilizes the features of the individual members can be achieved. For example, the refraction members share the power of the entire optical element, and the reflection members share aberration correction. In this way, the degree of freedom in optical design can be increased, and a high-performance optical element can be obtained.

Normally, chromatic aberrations are never produced in principle in a reflecting optical system built by only reflection members. However, when a hybrid optical system is built using both reflection members and refraction members, chromatic aberrations are produced in the refraction members.

To solve this problem, in this embodiment, a pair of refraction members respectively having positive and negative refractive powers are inserted in the reflecting optical system to cancel chromatic aberrations between the two refraction members. Hence, even though refraction members are used, chromatic aberration correction of the entire optical system can be achieved.

When the refraction member is formed of the same material as that of the reflection surface block, it can be simultaneously formed upon forming the reflection surface block. However, the refraction member may be formed of a material different from that of the reflection surface block in consideration of the above-mentioned chromatic aberration correction. In this embodiment, the refraction member of the positive refractive power is placed at the incidence side of the optical element, and the refraction member of the negative refractive power is placed at the exit side. Alternatively, the refraction member of the negative refractive power may be placed at the incidence side, and the refractive member of the positive refractive power may be placed at the exit side. When the optical system has a large chromatic aberration allowance, a pair of refraction members both having positive or negative refractive powers may be used in place of the pair of refraction members respectively having positive and negative refractive powers, or a refraction member having a positive or negative refractive power may be used alone.

When the refraction members are placed at the incidence and exit sides of the reflecting optical system, they can be used as covers for preventing dust from entering the reflecting optical system, thus preventing deterioration of image quality due to dust.

Fourth Embodiment

The fourth embodiment will be explained below with reference to FIG. 9. In this embodiment, a refraction member is placed next to a reflection surface block, which does not oppose the first and second reflection surface blocks.

Figure 9:
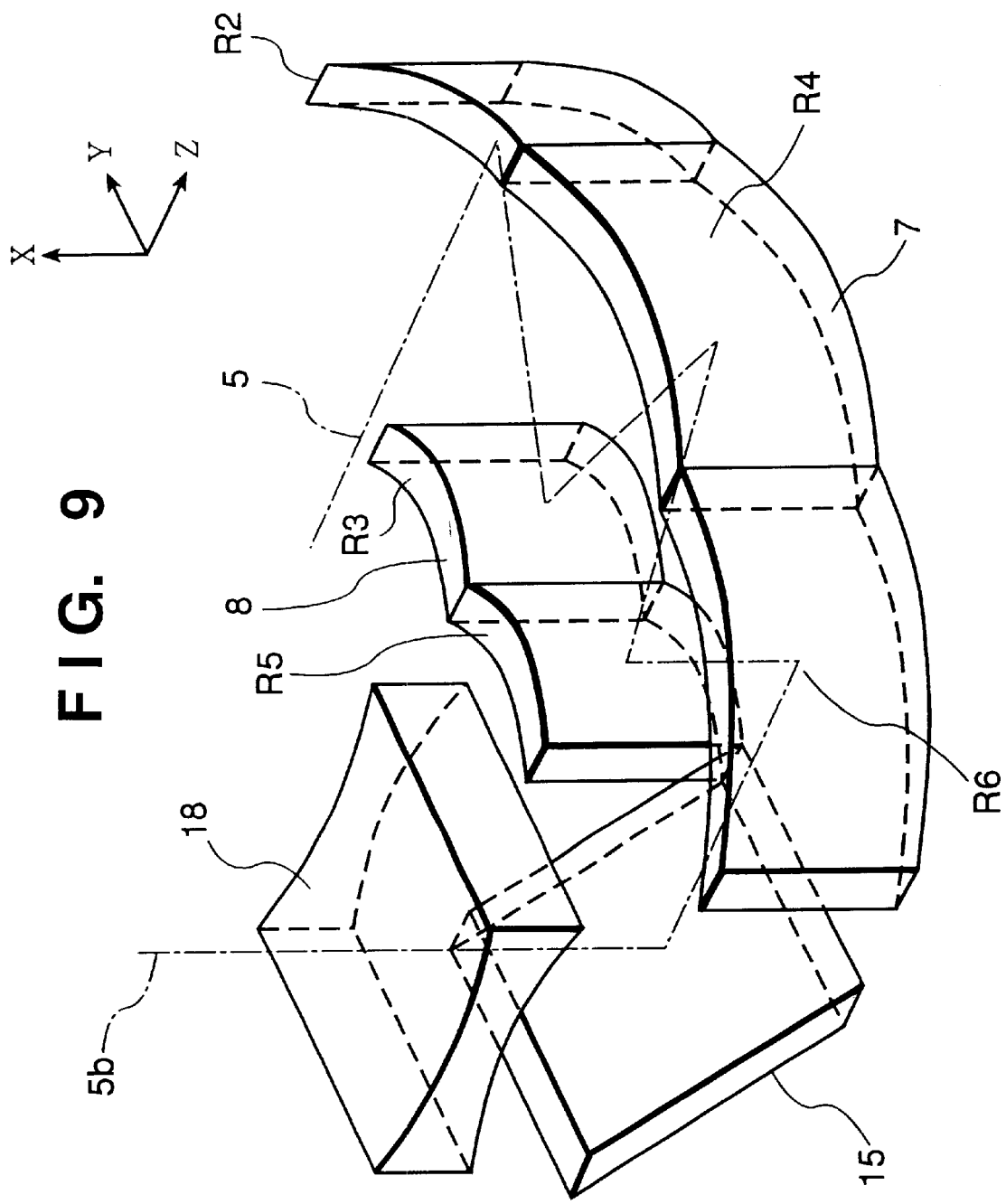
FIG. 9 is a perspective view for explaining the fourth embodiment of the present invention.

Referring to FIG. 9, a third reflection surface block 15 is placed next to the convex mirror R5 of the second reflection surface block 8, does not oppose the first and second reflection surface blocks 7 and 8, and has a tilt of around 45° with respect to the incidence reference axis 5. With this block, the reference axis 5 which leaves in the −Z-axis direction in the first embodiment leaves the optical element in the +X-axis direction.

On a reference axis $5b$ that leaves the optical element in the +X-axis direction, a refraction member 18 having a negative refractive power is placed next to the third reflection surface block 15.

Normally, by bending the optical path, the distance from the final plane to the image plane inevitably decreases. In this embodiment, by synthesizing the third reflection surface block 15 and refraction member 18, a decrease in back focus length produced upon bending the optical path can be corrected.

In this fashion, by placing the refraction member next to the reflection surface block, the degree of freedom in optical design can be increased, imaging performance can be improved, and the degree of freedom in optical system layout can also be increased. In addition, dust can be prevented from entering the reflecting optical system.

Fifth Embodiment

The first example of a metal mold structure for forming the aforementioned reflection surface blocks will be described below with reference to FIG. 10.

Figure 10:
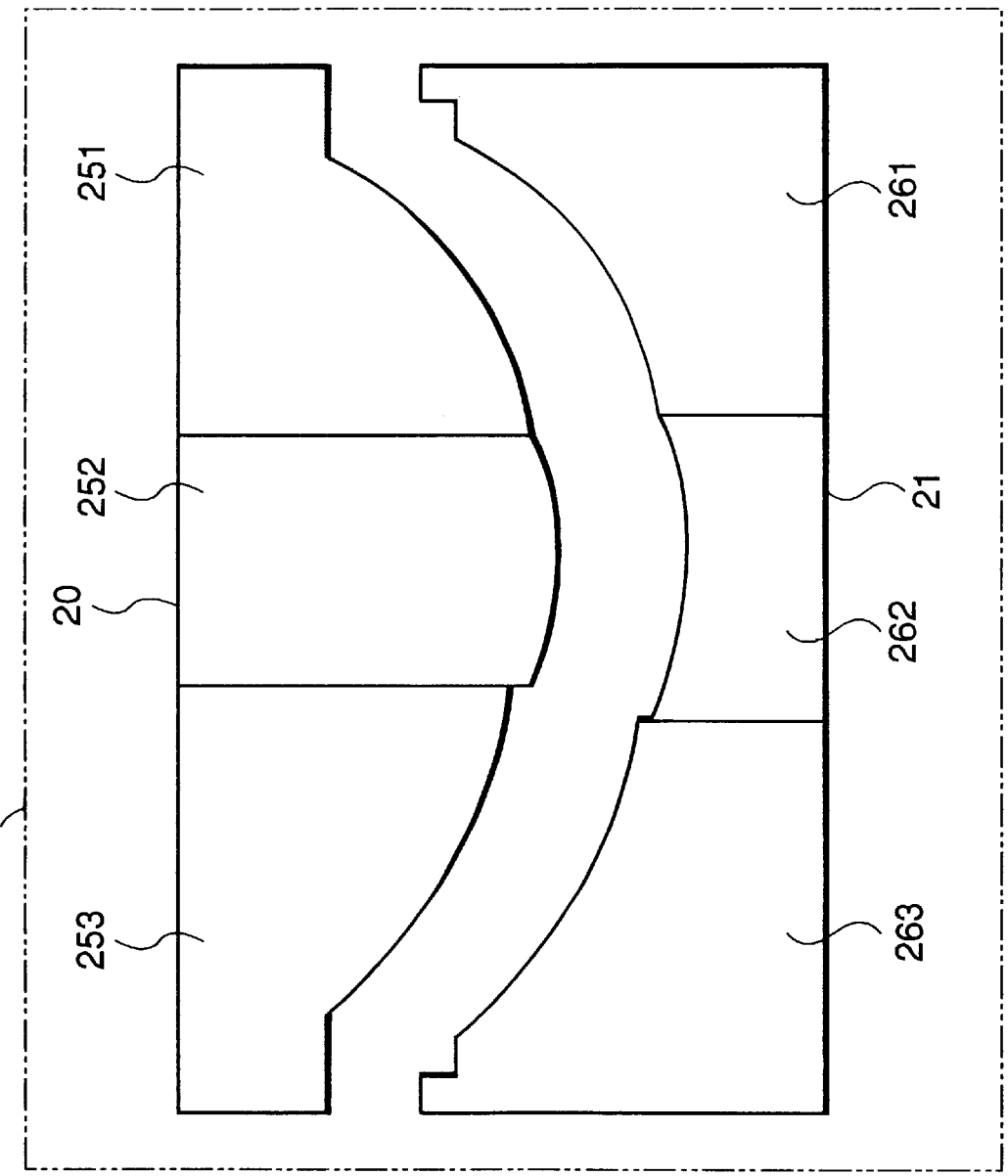
FIG. 10 is a view for explaining an example of a metal mold structure in the present invention.

FIG. 10 is a sectional view of a metal mold 19 for forming the first reflection surface block 7 in the first embodiment. The metal mold 19 is made up of a pair of metal mold units 20 and 21 used for integrally forming the concave mirror R2, concave mirror R4, and concave mirror R6 that form the first reflection surface block 7.

Note that the metal mold unit 20 is comprised of three metal mold blocks 251, 252, and 253 which respectively correspond to the three reflection surfaces, i.e., the concave mirror R2, concave mirror R4, and concave mirror R6 that form the first reflection surface block 7, and the metal mold unit 21 is also comprised of three metal mold blocks 261, 262, and 263 respectively corresponding to the three reflection surfaces.

In this embodiment, since metal mold blocks corresponding to a plurality of reflection surfaces having curvatures, which construct each reflection surface block, are prepared as units, even when the individual reflection surfaces are placed at decentered positions, the metal mold shapes can be freely designed, thus allowing integral formation of the reflection surface block.

Since the metal mold blocks corresponding to the individual reflection surfaces can be manufactured, the work margin from the effective light ray region, which is required in normal metal mold working, need not be excessively estimated, and the spacing margin between neighboring reflection surfaces can be minimized. Consequently, the size of the reflection surface block as a set of reflection surfaces can be minimized.

However, when a metal mold is divided in units of metal mold blocks, the positions of the divided metal mold blocks must be accurately adjusted to guarantee high positional precision among the divided metal mold blocks. When each reflection surface has strict positional precision, a metal mold that forms a plurality of reflection surfaces having curvatures by a single, continuous surface is preferably used.

More specifically, when the reflection surfaces are close to each other, or when it is impossible to uniquely set the step amount, the blocks that construct the reflection surfaces must be divided. If the individual divided reflection surface blocks are formed in correspondence with effective light ray regions, the effective light ray regions have various shapes such as an ellipse, polygon, and the like based on a circle and rectangle, as shown in FIGS. 15, 16, 26, and 27, and also have various sizes in correspondence with the amounts of reflected effective light rays. When all the mirror surface shapes are standardized to a rectangular shape without being influenced by various relationships with the effective light ray regions, and the mirror surface work area of each divided reflection surface block is determined in correspondence with the one having the broadest mirror surface area, the quality of each block can be improved, and high positional precision upon assembly of the reflection surface blocks can be maintained.

However, when the neighboring portions of the reflection surfaces of the reflection surface blocks have a step therebetween, a plurality of reflection surfaces cannot be formed by a single, continuous surface.

The reason for such difficulty will be explained below with reference to FIGS. 11 and 12.

Figure 11:
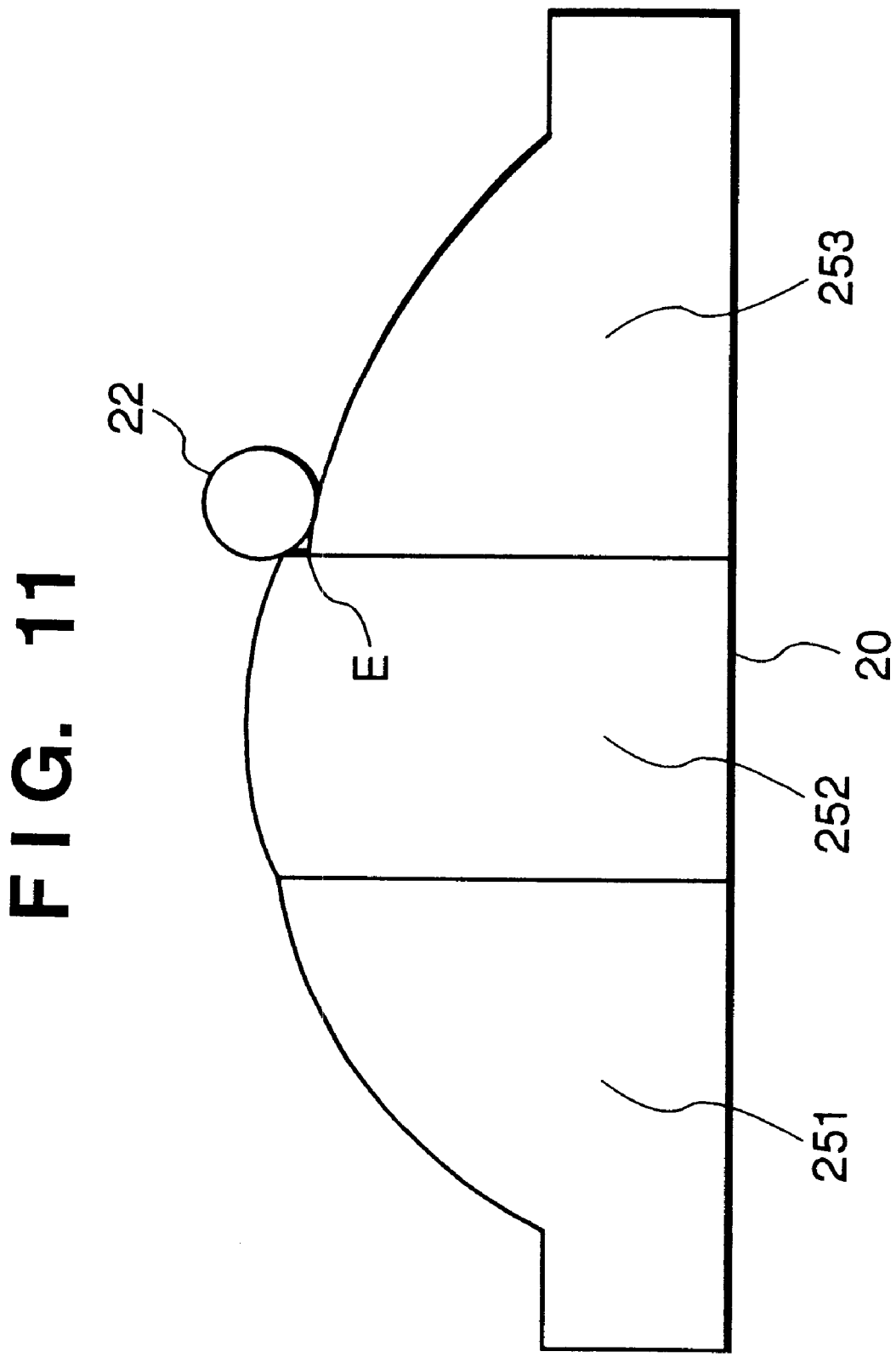
FIG. 11 is a view for explaining the method of working a metal mold used for forming a first reflection surface block.

FIG. 11 is a schematic view when the metal mold unit 20 is polished by a grinding wheel 22.

Referring to FIG. 11, assume that the metal mold blocks 252 and 253 corresponding to the concave mirrors R4 and R6 have a step therebetween. In general, the grinding wheel 22 has a spherical shape, and grinds each reflection surface on the metal mold. Since the grinding wheel 22 has a spherical shape, it cannot contact an edge portion E formed by the metal mold blocks 252 and 253 upon working the boundary portions between the metal mold blocks 252 and 253 corresponding to the concave mirrors R4 and R6. For this reason, the edge portion E cannot be ground to form the neighboring reflection surfaces by a single surface.

Figure 12:
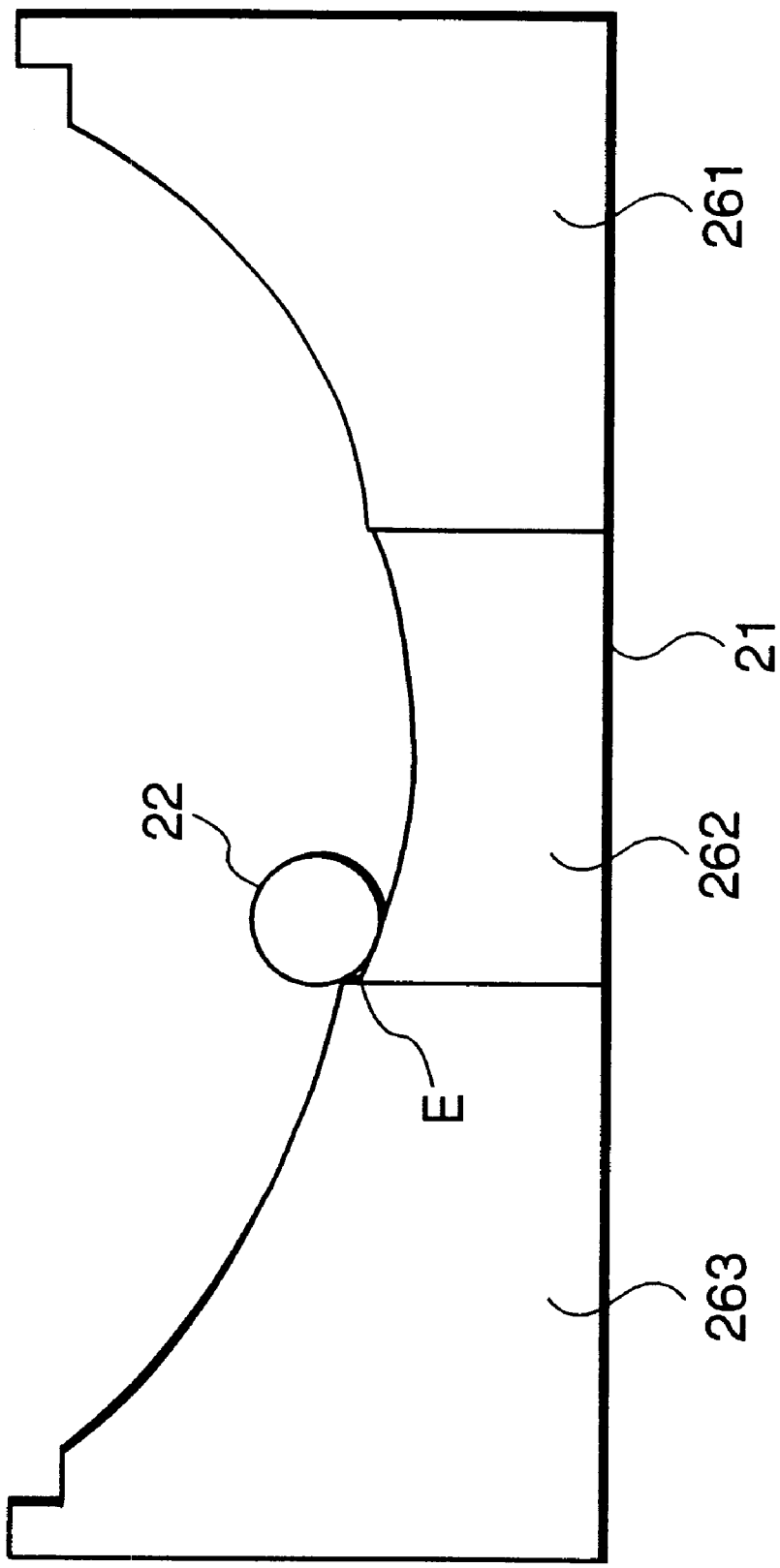
FIG. 12 is a view for explaining the method of working a metal mold used for forming a first reflection surface block.

FIG. 12 is a schematic view when the metal mold unit 21 is ground by the grinding wheel 22. For the same reason as described in FIG. 11, the edge portion E cannot be worked.

In order to avoid such situations, the neighboring portions of the respective reflection surfaces may be designed not to form any steps therebetween in optical design. However, such method is not preferable since the neighboring portions must have equal curvatures and, hence, the degree of freedom in design lowers.

In this embodiment, when the neighboring portions of the reflection surfaces that construct the reflection surface blocks have a step therebetween, the neighboring portions are formed outside the effective light ray regions of the reflection surfaces, and have shapes that smoothly connect the reflection surfaces to be worked, so as to form a plurality of reflection surfaces by a single, continuous surface.

Figure 13:
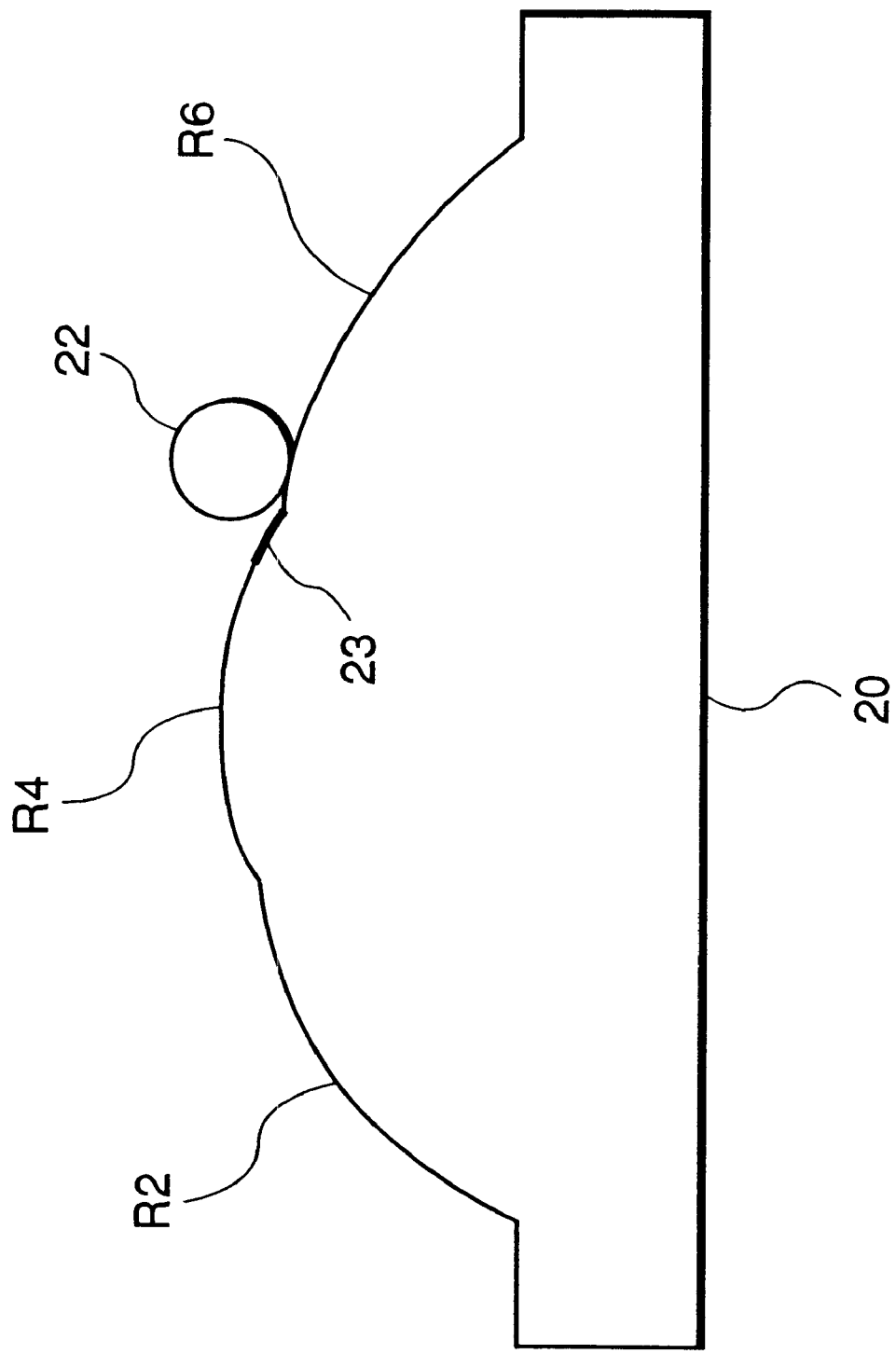
FIG. 13 is a view for explaining an example of a metal mold structure in the present invention.

FIG. 13 shows the second example of the metal mold structure in this embodiment. In this example, the concave mirrors R4 and R6 of the metal mold unit 20 are smoothly connected by a neighboring portion 23 without forming any step at the boundary portion therebetween, thus forming the metal mold unit 20 by a single, continuous surface.

Referring to FIG. 13, the neighboring portion 23 falls outside the effective regions of the concave mirrors R4 and R6, and its shape can be basically freely set as long as it does not eclipse the effective regions of the reflection surfaces.

As a method of determining the shape of the neighboring portion 23, for example, if the shape of the neighboring portion 23 is defined to smoothly connect the edges of the effective regions of the concave mirrors R4 and R6, the metal mold unit 20 can be formed by a single, continuous surface without forming any edge portions that cannot be ground by the grinding wheel 22.

Figure 14:
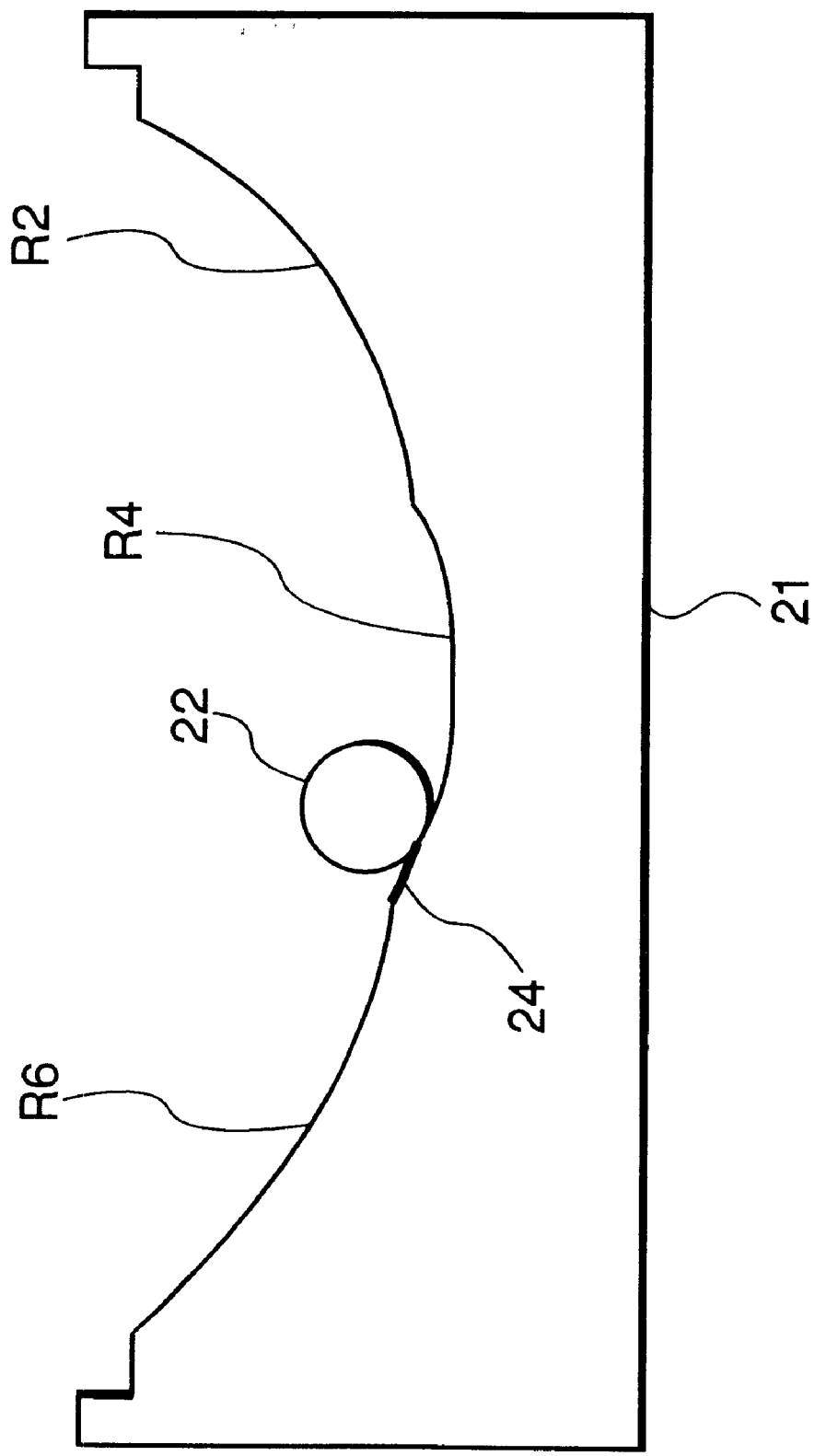
FIG. 14 is a view for explaining an example of a metal mold structure in the present invention.

FIG. 14 shows the third example of the metal mold structure in this embodiment. In this example, a neighboring portion 24 smoothly connects the concave mirrors R4 and R6 of the metal mold unit 21 by the same method as that described in FIG. 13 without forming any step at the boundary portion between the concave mirrors R4 and R6, thus forming the metal mold unit 21 by a single, continuous surface.

In this way, by smoothly connecting the neighboring reflection surfaces by portions outside their effective regions, the metal mold unit can be formed by a single, continuous surface, thus assuring high positional precision of each reflection surface.

Figure 15:
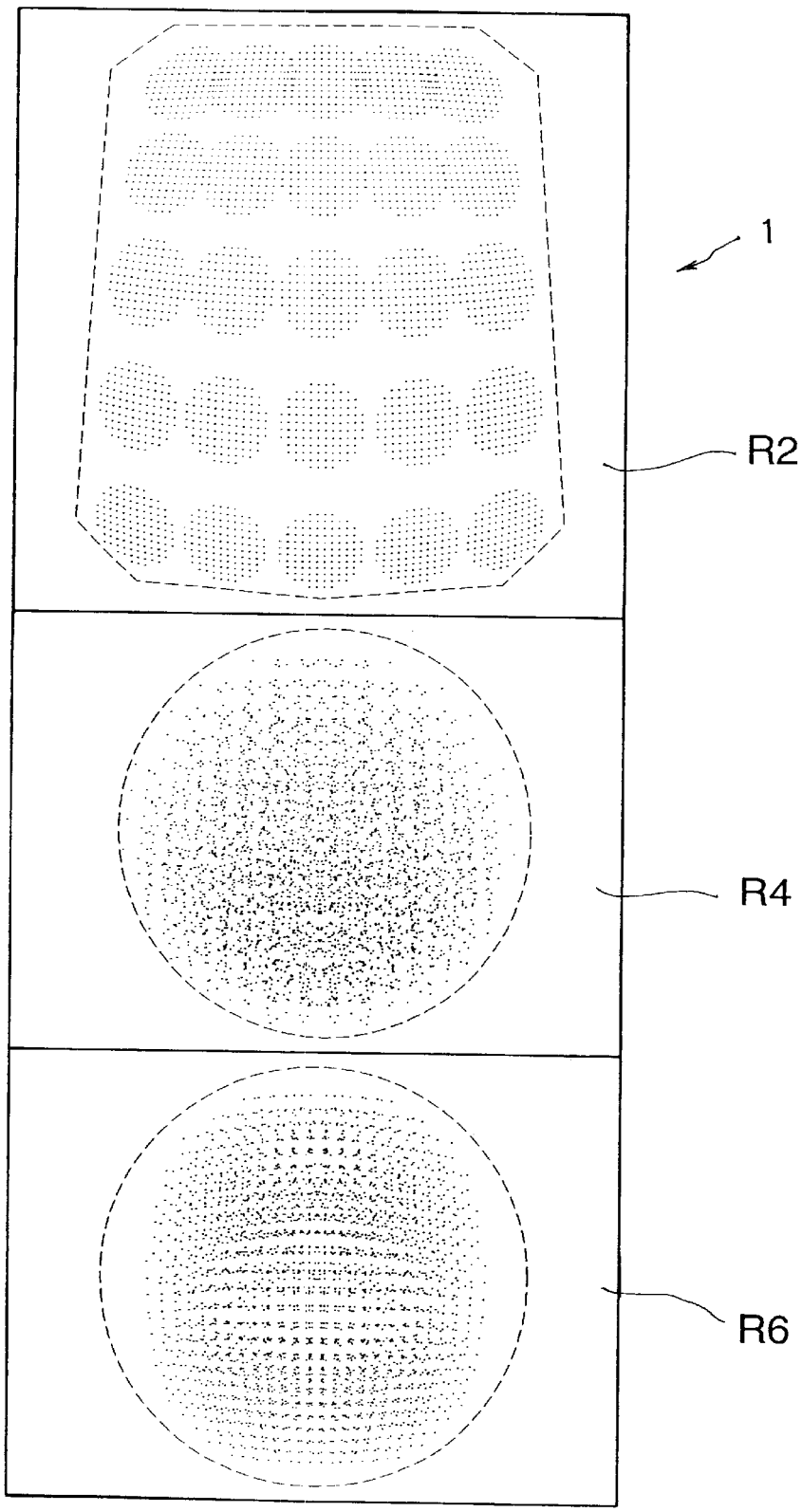
FIG. 15 is a sectional view upon observing an optical path section view in an actual design example from the −Z-axis direction.
Figure 16:
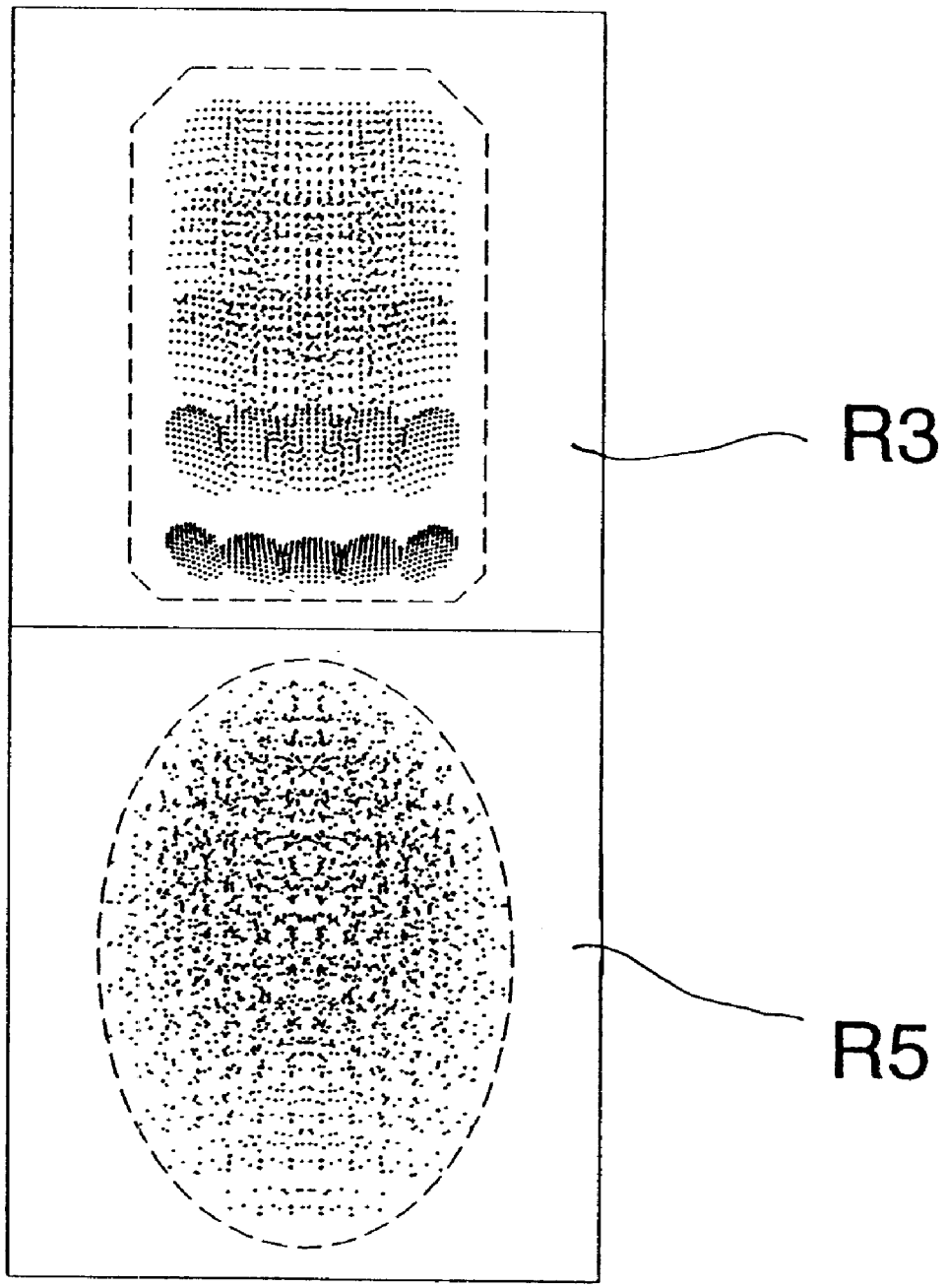
FIG. 16 is a sectional view upon observing an optical path section view in an actual design example from the +Z-axis direction.

FIGS. 15 and 16 are sectional views when the optical element 1 shown in FIG. 2 is viewed from the −Z-axis direction and +Z-axis direction. These sectional views also show the patterns of the effective light ray regions of the respective reflection surfaces.

FIG. 15 is a sectional view when the optical element 1 is viewed from the −Z-axis direction. Referring to FIG. 15, the optical element 1 has the concave mirror R2 as an entrance surface, the concave mirror R4, and the concave mirror R6 as an exit surface, which are formed adjacent to each other.

FIG. 16 is a sectional view when the optical element 1 is viewed from the +Z-axis direction. Referring to FIG. 16, the optical element 1 has the convex mirrors R3 and R5, which are located adjacent to each other.

Upon examination of the neighboring portions of the concave mirrors R2 and R4 in FIG. 15, the effective light ray region of the concave mirror R2 has a trapezoidal shape, and that of the concave mirror R4 has a circular shape.

By contrast, since the respective reflection surfaces of the optical element 1 have rectangular shapes in terms of their construction, as shown in FIG. 15, when a reflection film is formed on the entire reflection surface by deposition, sputtering, dipping, or the like, it must also be formed on a broad region other than the effective light ray regions.

When ghost light produced by the optical element 1 is taken into consideration, it is often produced by incident light coming from positions and angles different from those of effective light rays, and hence, light rays often hit positions outside the effective light ray regions.

When ghost light adversely influences the optical characteristics and impairs performance, such problem is solved by forming each reflection surface in correspondence with its effective light ray region, and placing a blank of the reflection surface block, which uses a rectangular member having a size that can completely cover the effective light ray region, below the block, thus assuring high precision by the same alignment method as that for the reflection surface block having the standardized rectangular shape.

When a reflection film is formed on the entire reflection surface, ghost light is highly likely to be produced from a surface portion other than the effective light ray region, and the reflection film deposition region is preferably reduced as much as possible to prevent ghost light.

In this embodiment, a reflection film is formed by deposition, sputtering, dipping, or the like only on each region indicated by the dotted line in FIG. 15 in a pattern nearly equal to the shape of the effective light ray region of each reflection surface to have a predetermined margin from the effective light ray region, thereby preventing ghost light from being produced by a region other than the effective light ray region.

Furthermore, in this embodiment, a region other than the deposition portions in FIG. 15 is formed as a non-smoothed surface, e.g., diffusion surface. By simultaneously forming this diffusion surface upon forming the reflection surface block, when ghost light produced by a surface portion other than the effective light ray region hits a region other than the deposition portion, the amount of ghost light is reduced by the diffusion effect of the diffusion surface, thereby lowering the ghost light intensity.

FIG. 17 shows numerical data in an actual design example.

Sixth Embodiment

The sixth embodiment of the present invention will be explained below.

Figure 18:
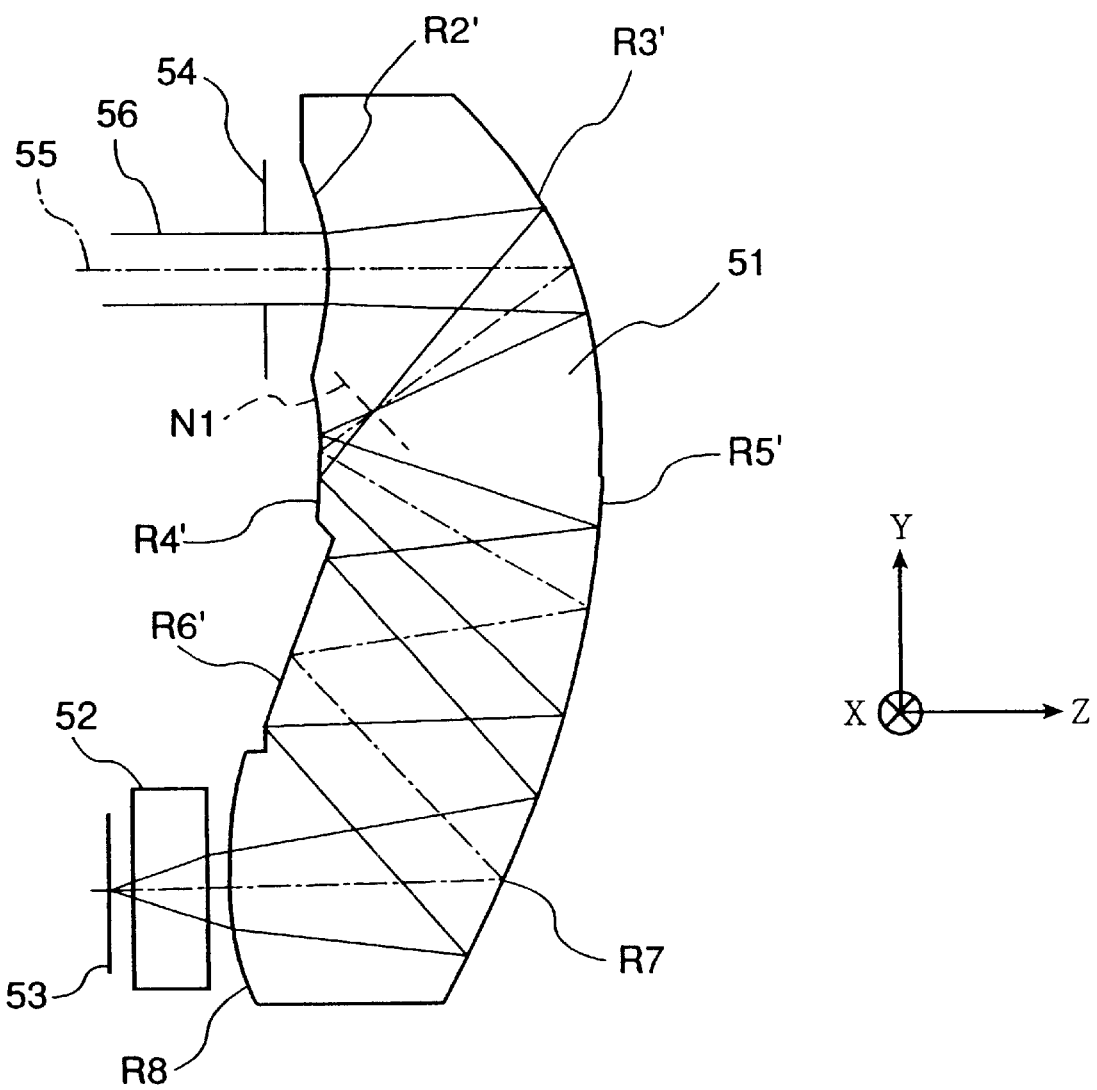
FIG. 18 is an optical path section view for explaining the sixth embodiment of the present invention.

FIG. 18 is an optical path sectional view of the sixth embodiment. Reference numeral 51 denotes an example of an optical element integrally formed with a plurality of reflection surfaces having curvatures. The optical element 51 is constructed by five reflection surfaces and two refraction surfaces, i.e., a concave refraction surface R2', concave mirror R3', convex mirror R4', concave mirror R5', convex mirror R6', concave mirror R7, and convex refraction surface R8 in turn from the object side. The reference axis that enters the optical element 51 and the reference axis that leaves the optical element 51 are parallel and have opposite sense. Reference numeral 52 denotes an optical correction plate such as a quartz low-pass filter, infrared cut filter, or the like; 53, an imaging element surface such as a CCD; 54, a stop disposed on the object side of the optical element 51; and 55, a reference axis of a photographing optical system.

The imaging relationship in this embodiment will be explained below. Light 56 coming from an object is incident on the concave refraction surface R2' of the optical element 51 after its incidence amount is limited by the stop 54.

The concave refraction surface R2' converts the incident object light 56 into divergent light by its power, and the concave mirror R3' then reflects it and forms a primary object image on an intermediate image plane N1 by its power.

In this way, since the object image is formed in the optical element 51 in an early stage, an increase in light ray effective diameter of the surface placed on the image side of the stop 54 can be suppressed.

The object light 56 that forms a primary image on the intermediate image plane N1 reaches the convex refraction surface R8 (convex to the image side) while being reflected by the convex mirror R4', concave mirror R5', convex mirror R6', and concave mirror R7 and being influenced by the powers of the respective reflection mirrors. The object light 56 refracted by the power of the convex refraction surface R8 forms an object image on the image sensing element surface 53.

In this fashion, the optical element 51 serves as a lens unit which has desired optical performance and positive power as a whole while repeating refractions at the entrance and exit surfaces and reflections at the plurality of reflection mirrors having curvatures.

Figure 19:
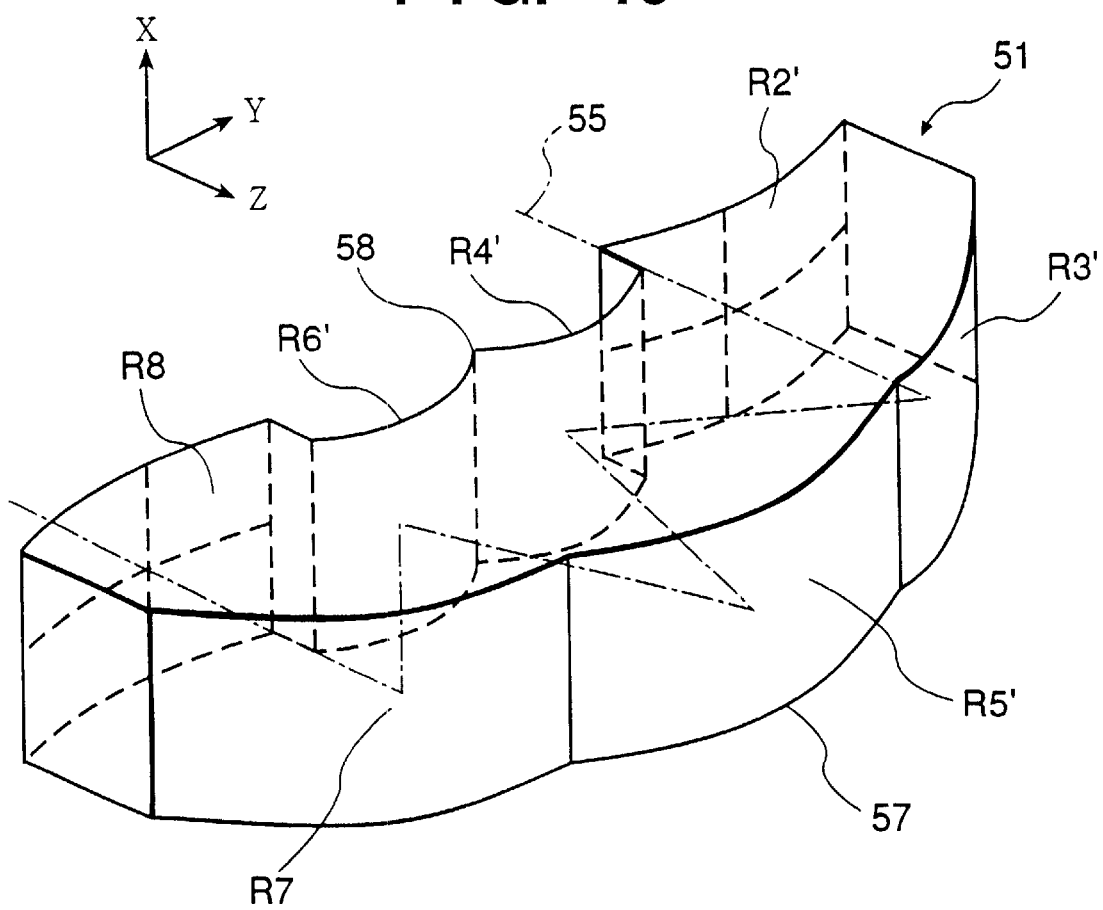
FIG. 19 is a perspective view for explaining the sixth embodiment.

FIG. 19 is a perspective view of the optical element shown in FIG. 18.

The same reference numerals in FIG. 19 denote the same parts as those in FIG. 18.

In this embodiment, the optical element 51 is formed by forming, on opposing surfaces of a transparent member, reflection surface groups, on each of which a plurality of neighboring reflection surfaces having curvatures are placed at neighboring positions, in addition to the pair of entrance and exit refraction surfaces.

Referring to FIG. 19, the concave mirror R3' which is located behind the concave refraction surface that receives light coming from an object and serves as the first reflection surface of the optical element 51, the concave mirror R5' as the third reflection surface, and the concave mirror R7 as the final reflection surface of the optical element 51 construct a first reflection surface group 57, on which three reflection surfaces are formed adjacent to each other.

The convex mirror R4' as the second reflection surface of the optical element 51, and the convex mirror R6' as the fourth reflection mirror, which are formed to oppose the first refection surface group 57, construct a second reflection surface group 58, which integrates two reflection surfaces. The first and second reflection surface groups 57 and 58 form the optical element 51.

In this way, using the reflection surface groups each of which integrates neighboring reflection surfaces placed at decentered positions, the assembly time can be shortened and layout errors upon assembly can be reduced as compared to the individual reflection surfaces which must be placed at predetermined decentered positions.

When the reflection surfaces of each reflection surface group are integrally formed using a metal mold, high positional precision and surface precision of the individual reflection surfaces can be guaranteed irrespective of production quantities, and high positional precision of the reflection mirrors, which is hard to attain in the conventional system, can be easily assured.

Furthermore, when zooming or focusing is done using the optical element of this embodiment, a holding portion for fixing the optical element to a movable stage may be directly formed on the optical element 51 in consideration of movement of the optical element on the movable stage.

Figure 20:
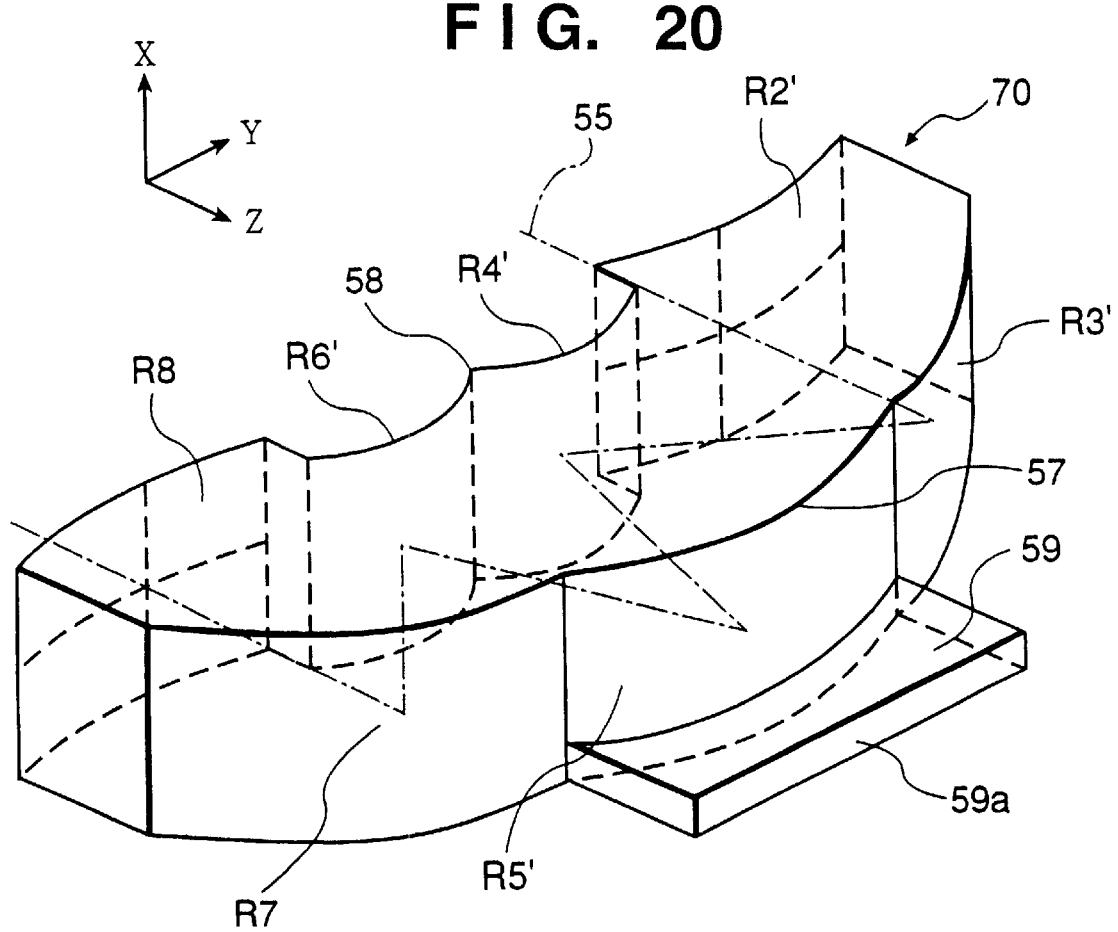
FIG. 20 is a perspective view for explaining the method of holding a reflection surface group of the sixth embodiment.

FIG. 20 shows an example of a holding portion formed on the optical element 51.

Referring to FIG. 20, a holding portion 59 is formed on the rear side of an effective reflection surface of the concave mirror R5' of the first reflection surface group 57, so that its bottom surface 59a extends in a direction parallel to a plane including the reference axis 55. Zooming or focusing is done by coupling the holding portion 59 to a movable stage (not shown) and moving that movable stage.

Since the plane including the reference axis 55 is parallel to the bottom surface 59a of the holding portion 59, the parallelism between the movable stage and optical element can be easily guaranteed by coupling the holding portion 59 and movable stage parallel to each other. For this reason, the influences of decentering and the like of the reference axis produced upon movement of the optical element can be removed, thus preventing deterioration of optical performance.

Note that the bottom surface 59a of the holding portion 59 preferably has a mirror surface. Furthermore, the surface roughness of the bottom surface 59a is preferably 0.08 μm or less (Rmax). If the bottom surface 59a is polished to a surface roughness of about 1 to 2 μm (Rmax), peak portions of the three-dimensional surface may be destroyed or shaved to impair the parallelism with the plane including reference axis 55, thus posing the problem of decentering again.

As another example of zooming or focusing using the optical element of this embodiment, a method of forming holes on the optical element, fitting a shaft into the holes, and moving the optical element along the shaft may be used.

Figure 21:
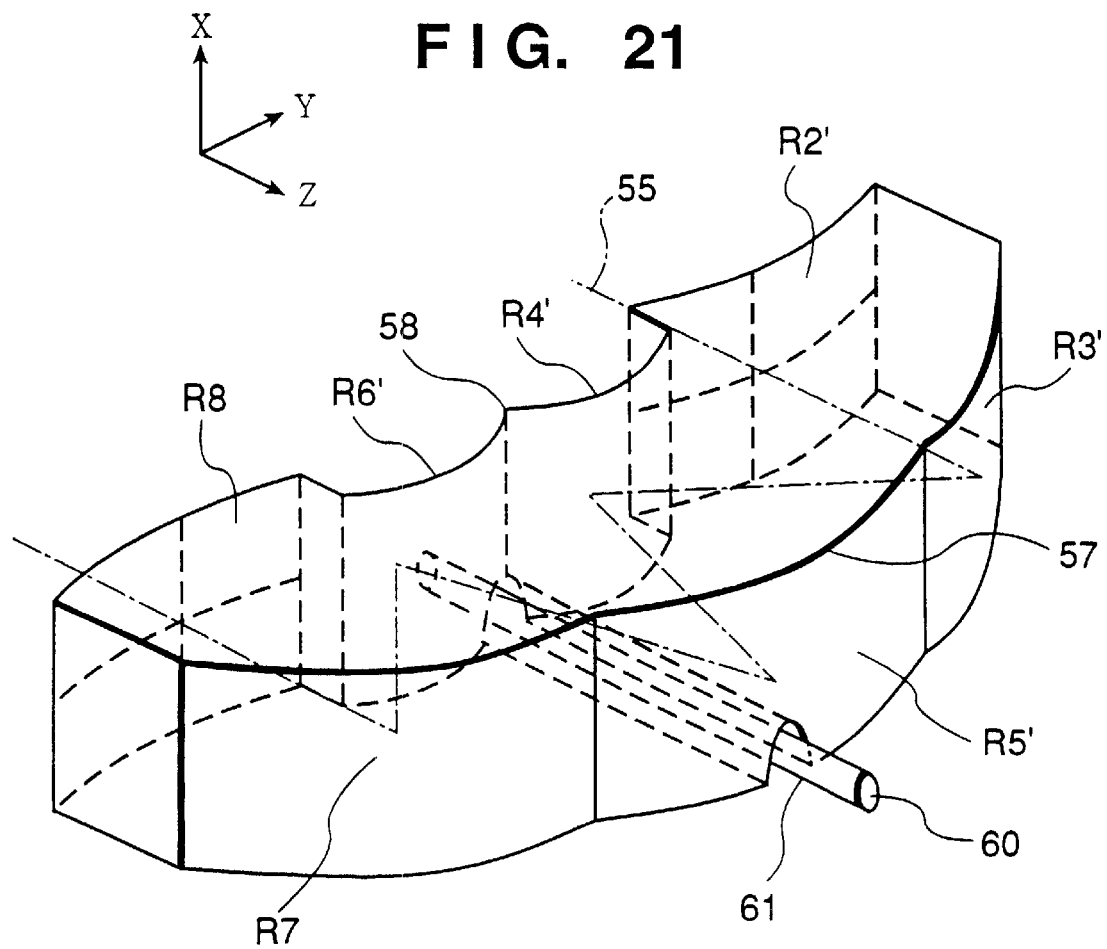
FIG. 21 is a perspective view for explaining another method of holding a reflection surface group of the sixth embodiment.

FIG. 21 shows an example in which a through hole 61 that receives a shaft 60 is formed on the first and second reflection surface groups 57 and 58.

Referring to FIG. 21, the hole 61 is formed in the first and second reflection surface groups 57 and 58 at positions which have equal distances from the plane including the reference axis 55, and are separated from a light ray effective portion of each reflection surface.

Upon fitting the shaft 60 in this hole 61, the shaft 60 stays parallel to the plane including the reference axis 55, and can serve as a guide upon movement of the optical element, thus translating the optical element.

In FIG. 21, only one shaft 60 is used. However, many shafts may be used.

To restate, by forming a reflecting optical element using a metal mold, the reflecting optical element can have a plurality of functions, e.g., a holding function, light-shielding function, and the like, the number of parts and manufacturing cost can be reduced, and the functions and performance of the optical element can be improved.

Seventh Embodiment

The seventh embodiment will be explained below with reference to FIG. 22. In this embodiment, another reflection surface group, which does not face the first and second reflection surface groups of the sixth embodiment, is added to change the directions the reference light ray that enters and leaves an optical element 70.

Figure 22:
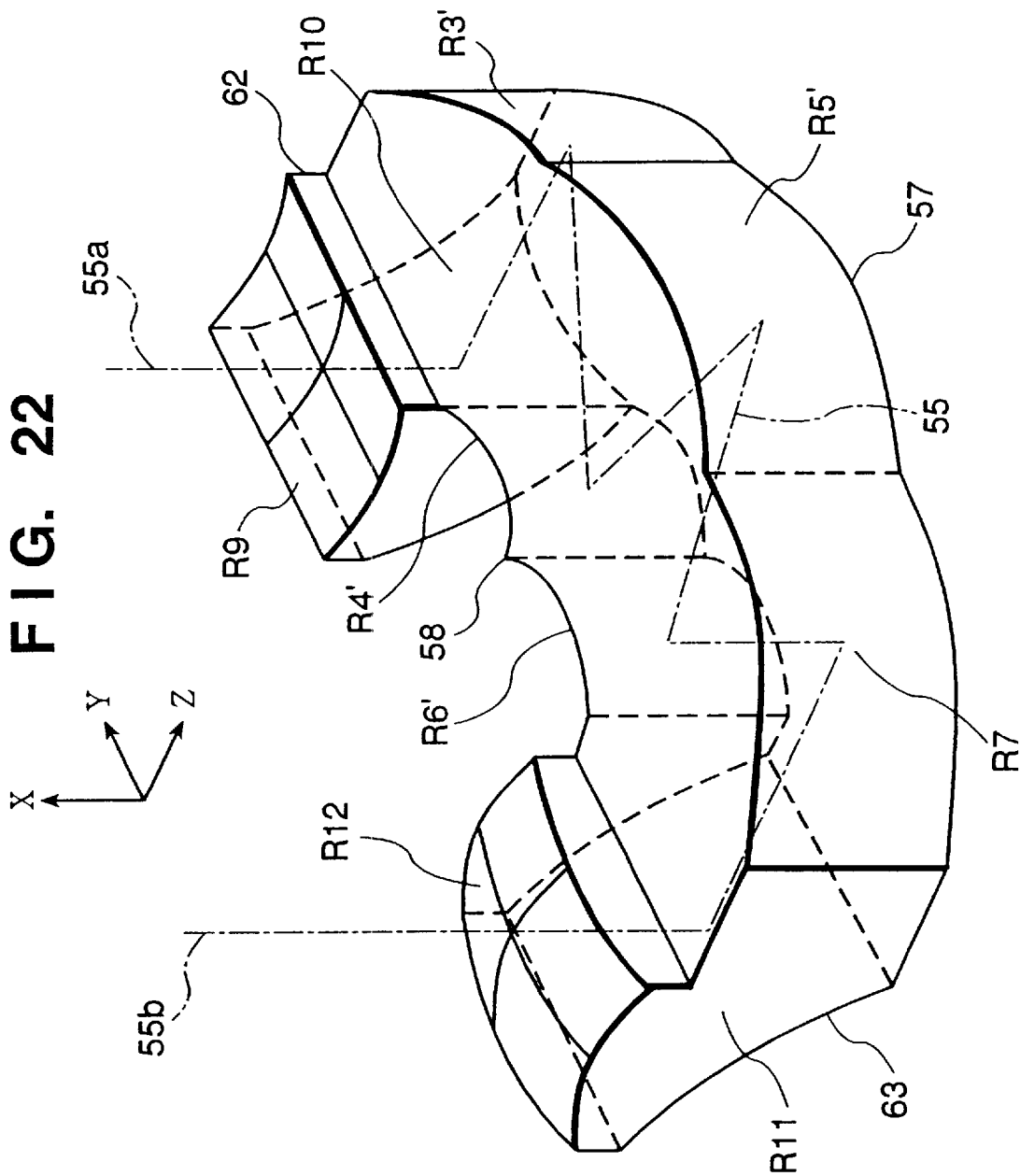
FIG. 22 is a perspective view for explaining the seventh embodiment.

Referring to FIG. 22, a third reflection surface group 62 is constructed by a concave mirror R10, and is placed next to the convex mirror R4' side of the second reflection surface group 58. The third reflection surface group 62 does not oppose the first and second reflection surface groups 57 and 58, and has a tilt of around 45° with respect to the incidence reference axis to convert a reference axis 5a, which enters from the +Z-axis direction in the sixth embodiment, into an axis from the +X-axis direction.

On the other hand, a fourth reflection surface group 63 is constructed by a convex mirror R11, and is placed next to the convex mirror R6' of the second reflection surface group 58. The fourth reflection surface group 63 does not oppose the first and second reflection surface groups 57 and 58, and has a tilt of around 45° with respect to the incidence reference axis to make a reference axis 55b, which leaves in the −Z-axis direction in the sixth embodiment, leave in the +X-axis direction.

In this embodiment, since the optical system is built by only reflection surfaces in contrast to a conventional system in which reflection mirrors are inserted in a refraction lens system to change the angle of light rays, the third and fourth reflection surface groups which do not oppose the first and second reflection surface groups, can be easily added. The added reflection surface groups can change the entrance and exit directions of a light ray while correcting aberrations of the optical element.

In this embodiment, the reflection surface groups which neighbor the first and second reflection surface groups may be simultaneously formed upon formation of the first and second reflection surface groups.

For example, since the third reflection surface group neighbors the second reflection surface group, it may be formed using the metal mold for the second reflection surface group.

In this fashion, by adding another reflection surface group, which does not oppose the first and second reflection surface groups, the entrance and exit directions of the reference axis light ray can be freely set. In a camera using the optical element of this embodiment, since the entrance and exit directions can be freely set, size and thickness reductions of the camera can be attained due to a decrease in dead space, and a camera having a shape that has never been seen before can be achieved.

In FIG. 22, an entrance refraction surface R9 is placed on the incidence side of the concave mirror R10, and has a negative refractive power.

An exit refraction surface R12 is placed on the exit side of the convex mirror R11, and has a positive refractive power.

In general, upon bending the optical path at the entrance side, since the distance from each surface that constructs the optical element to the stop inevitably increases, the effective light ray region of each surface broadens, and the entire optical element becomes large in size.

To solve this problem, in this embodiment, an increase in effective light ray region of each surface resulting from bending of the optical path is suppressed by synthesizing the concave mirror R10, and entrance refraction surface R9, thereby achieving a size reduction of the entire optical element.

Also, by bending the optical path at the exit side, the distance from the final plane to the image plane inevitably decreases. In this embodiment, by synthesizing the convex mirror R11 and exit refraction surface R12, a decrease in back focus length produced upon bending the optical path can be corrected.

As described above, in this embodiment, by appropriately placing the refraction members and reflection members, a design that utilizes the features of the individual members can be achieved. For example, the refraction members share the power of the entire optical element, and the reflection members share aberration correction. In this way, the degree of freedom in optical design can be increased, and a high-performance optical element can be obtained.

Eighth Embodiment

The first example of a metal mold structure for forming the above-mentioned reflection surface groups will be explained below with reference to FIG. 23.

Figure 23:
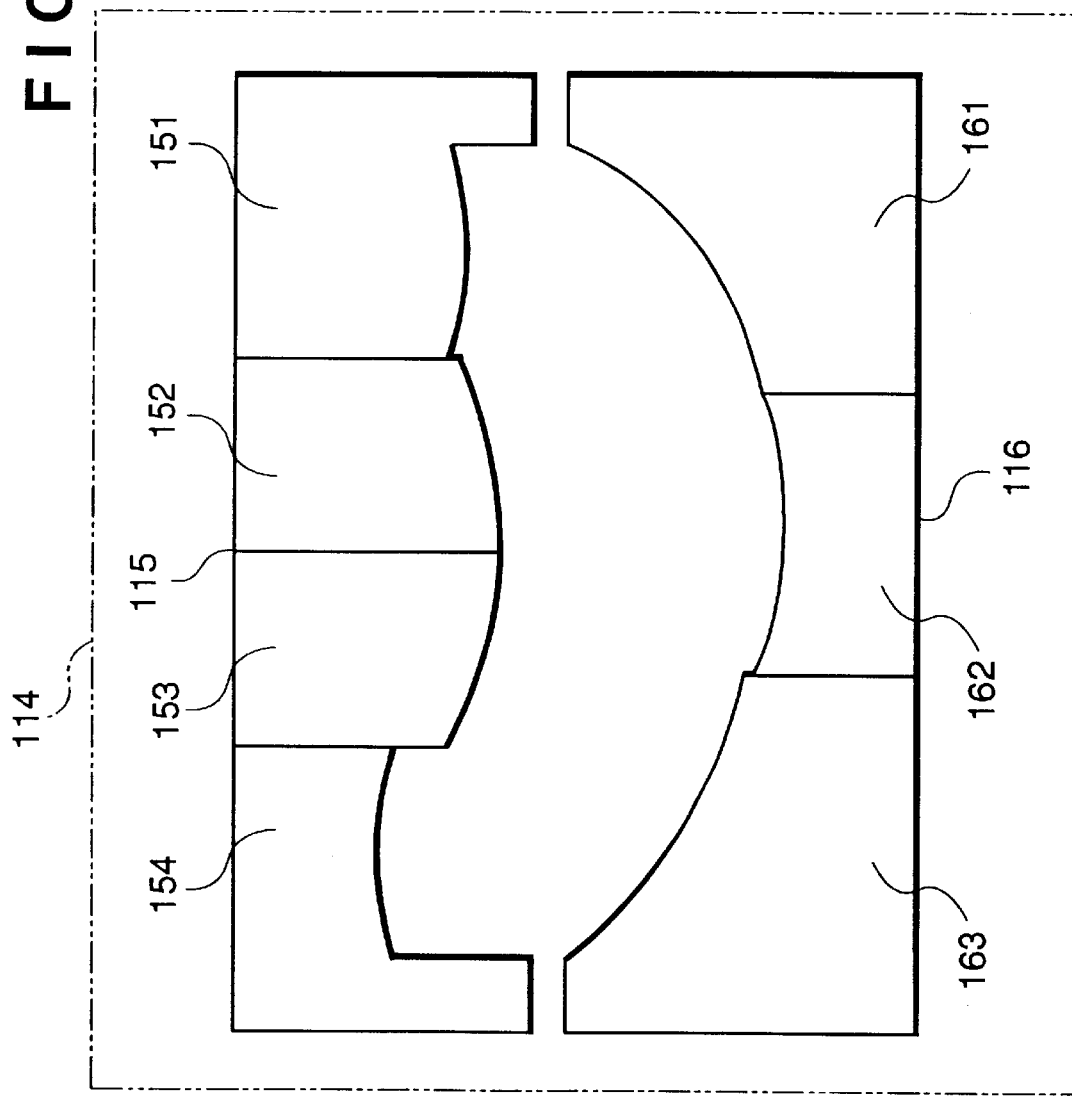
FIG. 23 is a view for explaining an example of a metal mold structure in the present invention.

FIG. 23 is a sectional view of a metal mold 114 for forming the optical element 51 in the sixth embodiment. The metal mold 114 is constructed by a pair of metal mold units 115 and 116 used for integrally forming the refraction surfaces R2' and R8, concave mirror R3', convex mirror R4', concave mirror R5', convex mirror R6', and concave mirror R7 that construct the optical element 51.

Note that the metal mold unit 116 is composed of three metal mold blocks 161, 162, and 163 which respectively correspond to the three reflection surfaces, i.e., the concave mirror R3', concave mirror R5', and concave mirror R7 that form the first reflection surface group 57.

The metal mold unit 115 is composed of four metal mold blocks 151, 152, 153, and 154 respectively corresponding to the surfaces of the second reflection surface group 58 including the entrance refraction surface R2', convex mirror R4', and convex mirror R6', and the exit refraction surface R8.

In this embodiment, since metal mold blocks corresponding to a plurality of reflection surfaces having curvatures, which construct reflection surface groups and refraction surfaces, are prepared as units, even when the individual reflection surfaces and refraction surfaces are located at decentered positions, the metal mold shapes can be freely designed, thus allowing integral formation of the reflection surface groups and refraction surfaces.

Since the metal mold blocks corresponding to the individual reflection surfaces can be manufactured, the work margin from the effective light ray region, which is required in normal metal mold working, need not be excessively estimated, and the spacing margin between neighboring reflection surfaces can be minimized. Consequently, the size of the reflection surface group as a set of reflection surfaces can be minimized.

However, when a metal mold is divided in units of metal mold blocks, the positions of the divided metal mold blocks must be accurately adjusted to guarantee high positional precision among the divided metal mold blocks. When each reflection surface has strict positional precision, a metal mold that forms a plurality of reflection surfaces having curvatures by a single, continuous surface is preferably used.

However, when the neighboring portions of the reflection surfaces of the reflection surface blocks have a step therebetween, a plurality of reflection surfaces cannot be formed by a single, continuous surface.

The reason for such difficulty will be explained below with reference to FIG. 24.

Figure 24:
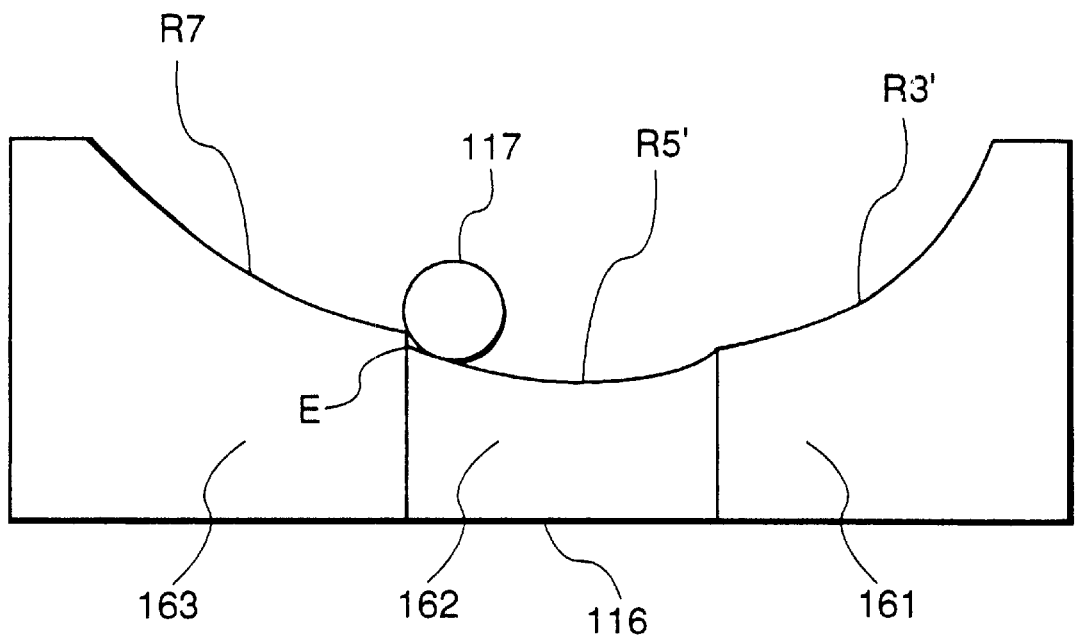
FIG. 24 is a view for explaining the method of working a metal mold.

FIG. 24 is a schematic view when the metal mold unit 116 is ground by a grinding wheel 117.

Referring to FIG. 24, assume that the metal mold blocks 162 and 163 corresponding to the concave mirrors R5' and R7 have a step therebetween. In general, the grinding wheel 117 has a spherical shape, and grinds each reflection surface on the metal mold. Since the grinding wheel 117 has a spherical shape, it cannot contact an edge portion E formed by the metal mold blocks 162 and 163 upon working the boundary portions between the metal mold blocks 162 and 163 corresponding to the concave mirrors R5' and R7. For this reason, the edge portion E cannot be ground to form the neighboring reflection surfaces by a single surface.

In order to avoid such situations, the neighboring portions of the respective reflection surfaces may be designed not to form any steps therebetween in optical design. However, such method is not preferable since the neighboring portions must have equal curvatures and, hence, the degree of freedom in design lowers.

In this embodiment, when the neighboring portions of the reflection surfaces that form the reflection surface groups have a step therebetween, the neighboring portions are formed outside the effective light ray regions of the reflection surfaces, and have shapes that smoothly connect the reflection surfaces to be worked, so as to form a plurality of reflection surfaces by a single, continuous surface.

Figure 25:
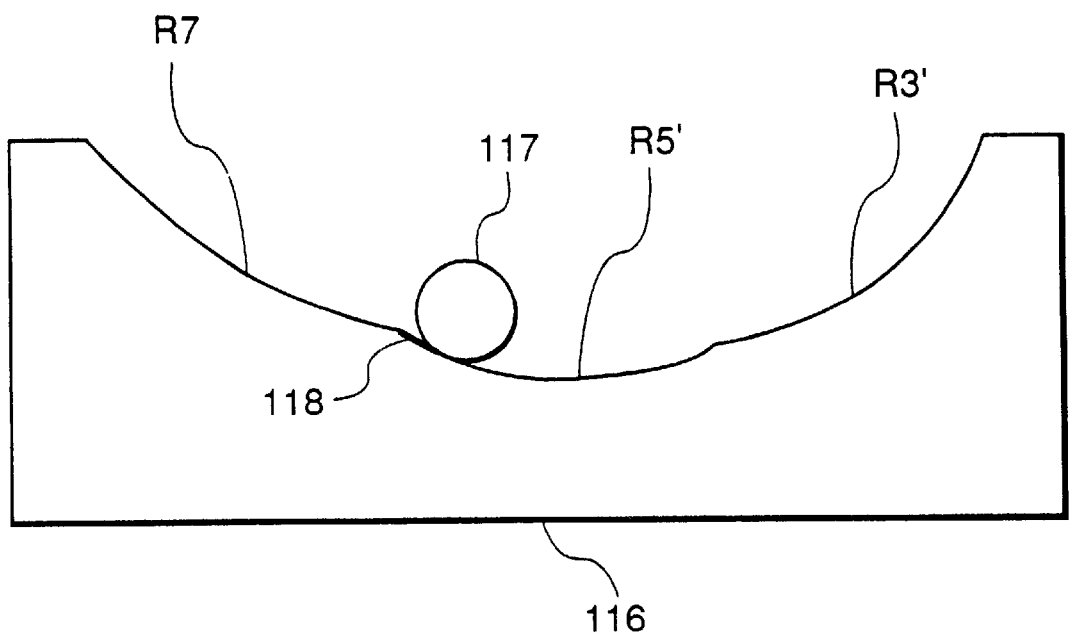
FIG. 25 is a view for explaining an example of a metal mold structure in the present invention.

FIG. 25 shows the second example of the metal mold structure in this embodiment. In this example, the concave mirrors R5' and R7 of the metal mold unit 116 are smoothly connected by a neighboring portion 118 without forming any step at the boundary portion therebetween, thus forming the metal mold unit 116 by a single, continuous surface.

Referring to FIG. 25, the neighboring portion 118 falls outside the effective regions of the concave mirrors R5' and R7, and its shape can be basically freely set as long as it does not eclipse the effective regions of the reflection surfaces.

As a method of determining the shape of the neighboring portion 118, for example, if the shape of the neighboring portion 118 is defined to smoothly connect the edges of the effective regions of the concave mirrors R5' and R7, the metal mold unit 116 can be formed by a single, continuous surface without forming any edge portions that cannot be ground by the grinding wheel 117.

In this way, by smoothly connecting the neighboring reflection surfaces by portions outside their effective regions, the metal mold unit can be formed by a single, continuous surface, thus assuring high positional precision of each reflection surface.

Figure 26:
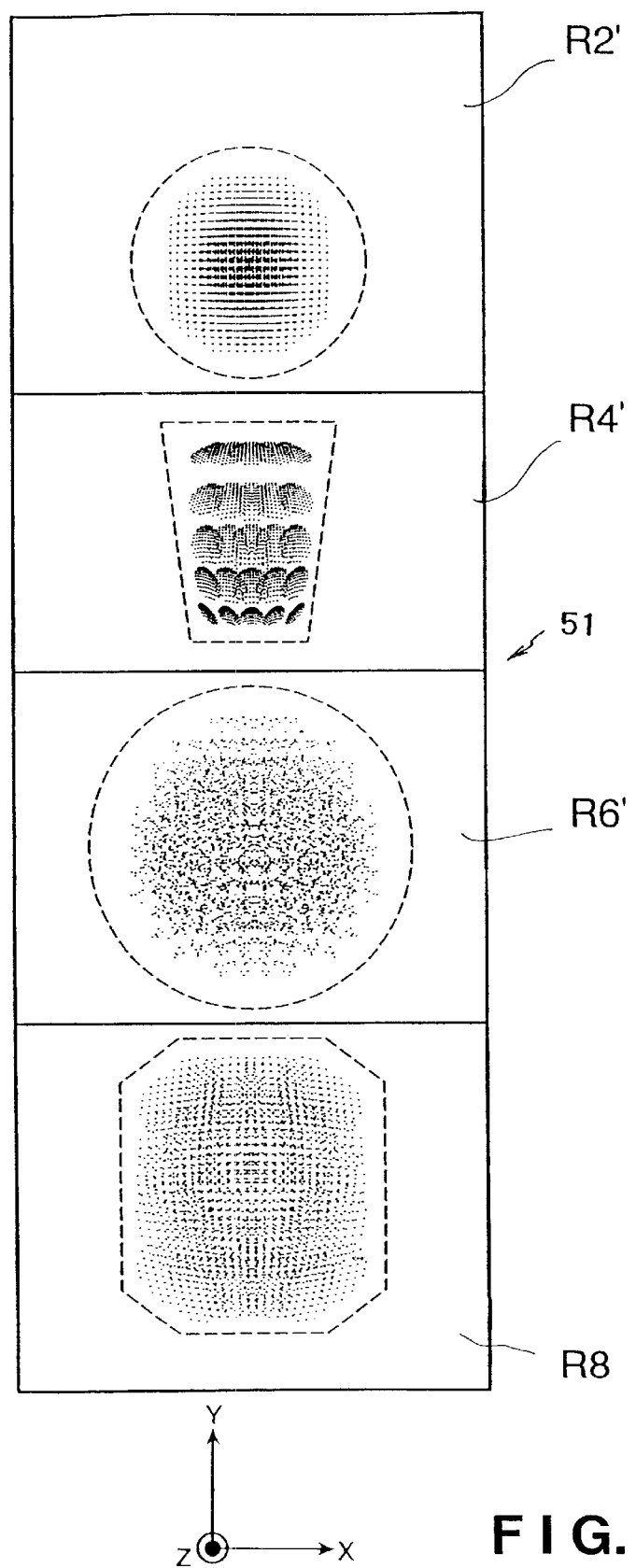
FIG. 26 is a sectional view upon observing an optical path section view in an actual design example from the −Z-axis direction.
Figure 27:
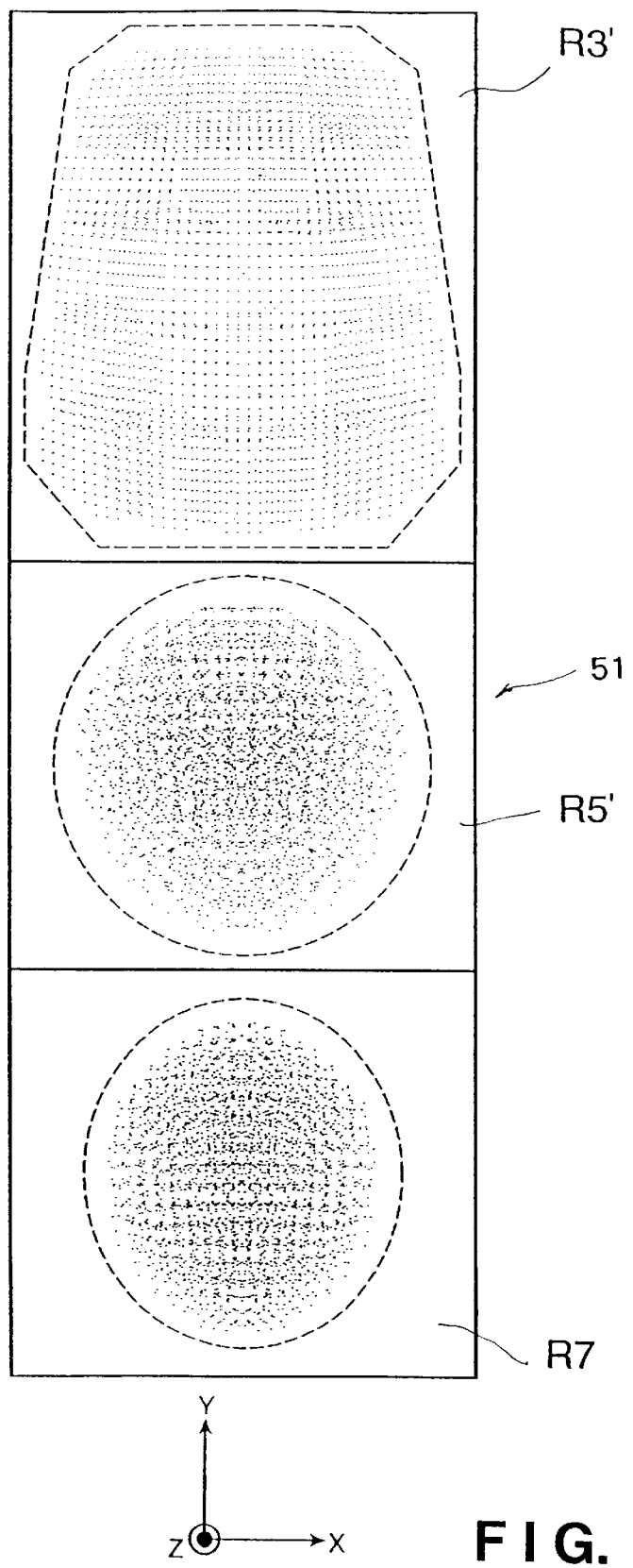
FIG. 27 is a sectional view upon observing an optical path section view in an actual design example from the +Z-axis direction.
Figure 29:
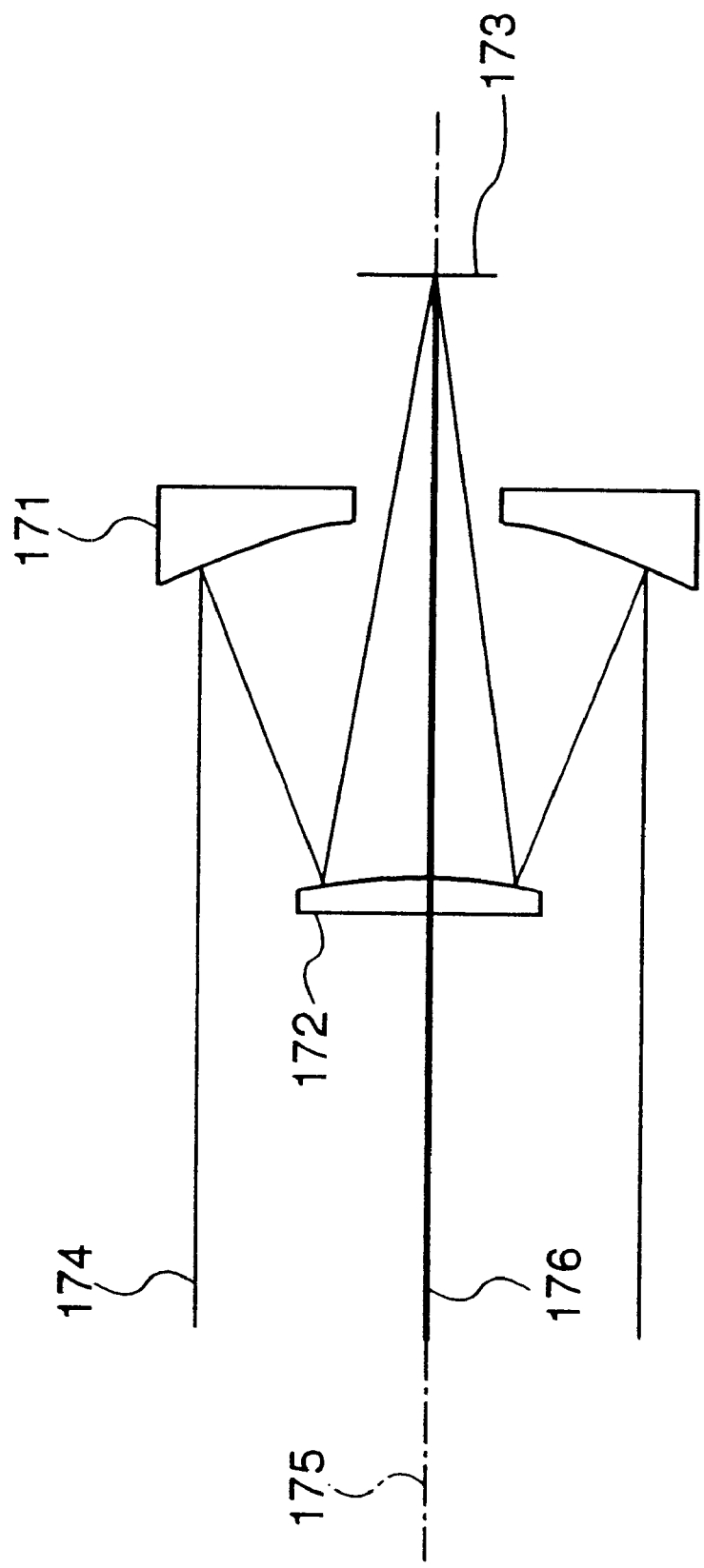
FIG. 29 is an explanatory view of a conventional reflection optical system.
Figure 30:
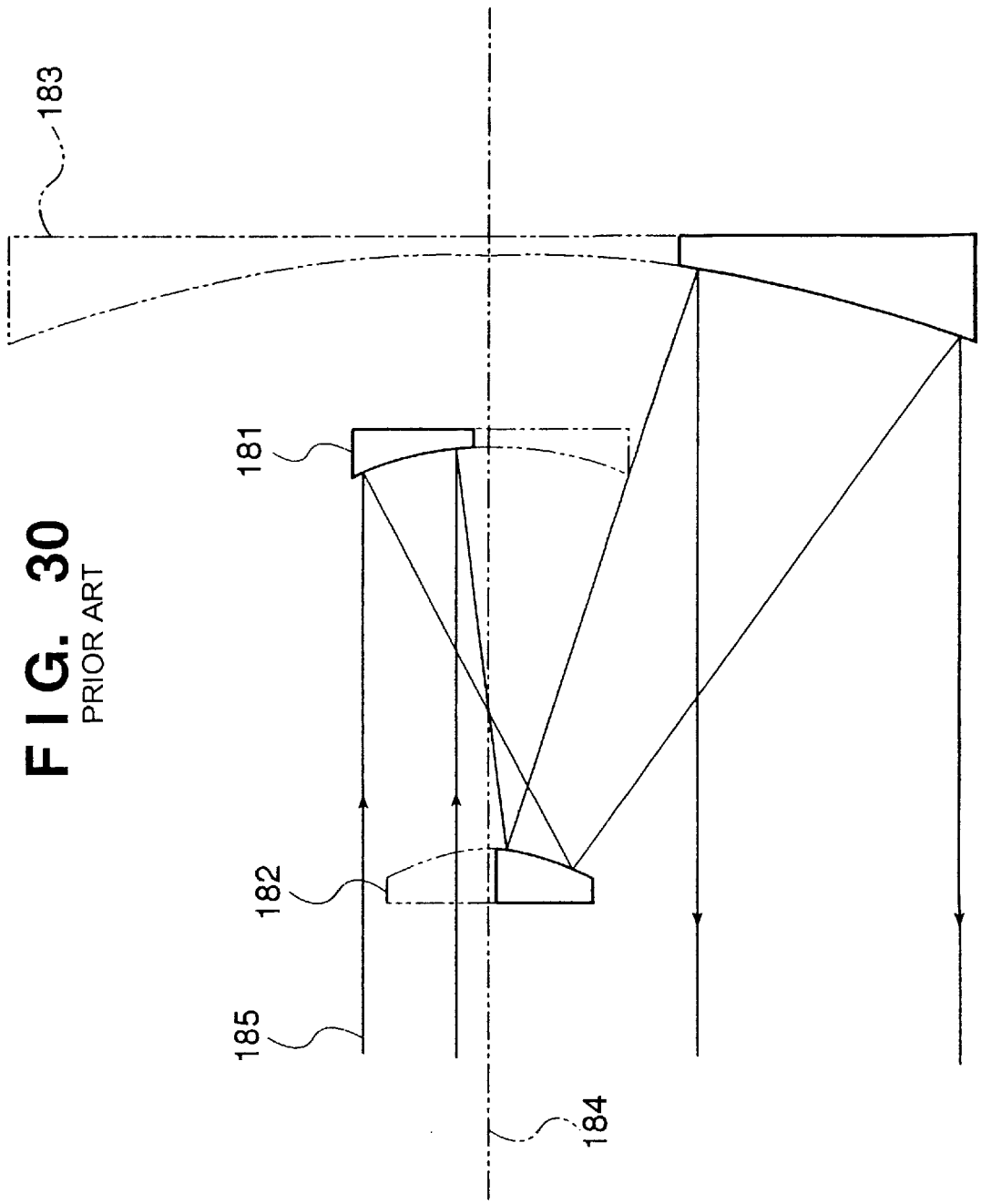
FIG. 30 is an explanatory view of another reflection optical system.
Figure 31:
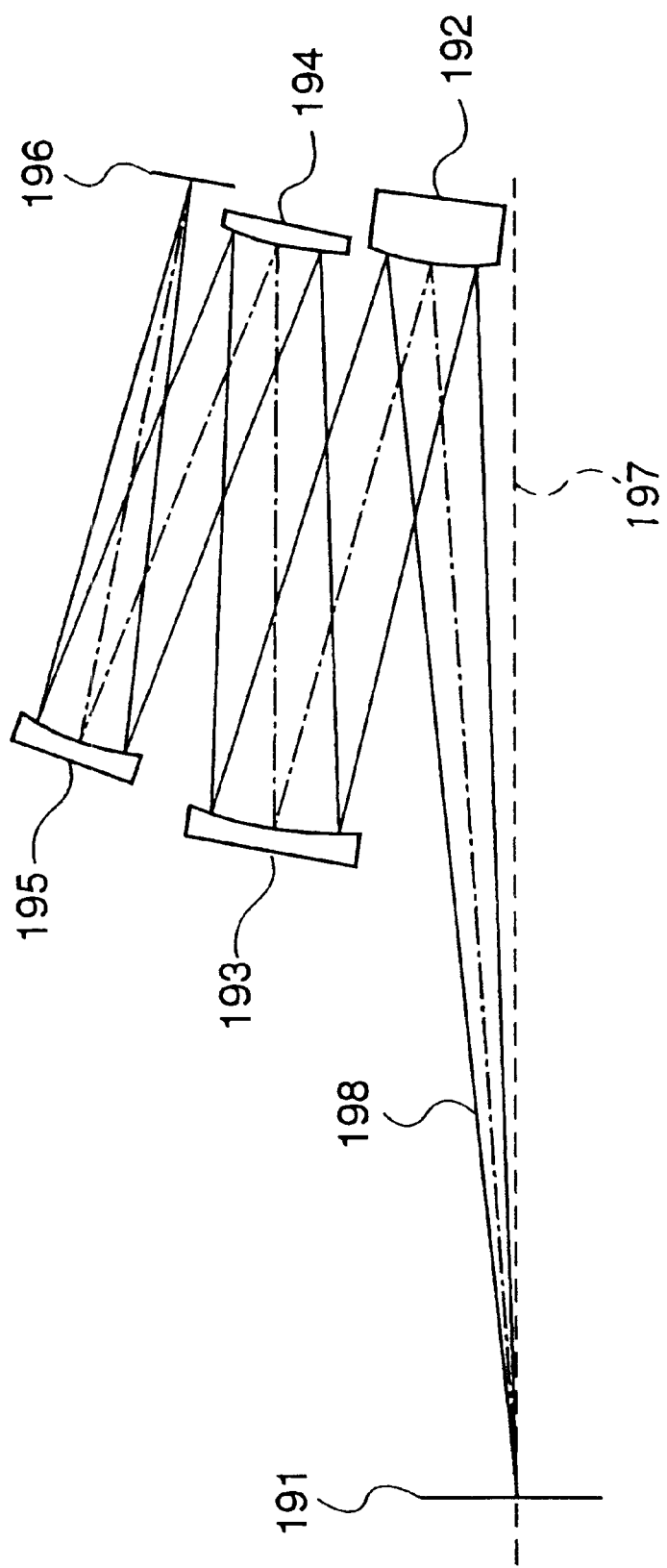
FIG. 31 is an explanatory view of still another reflection optical system.
Figure 32:
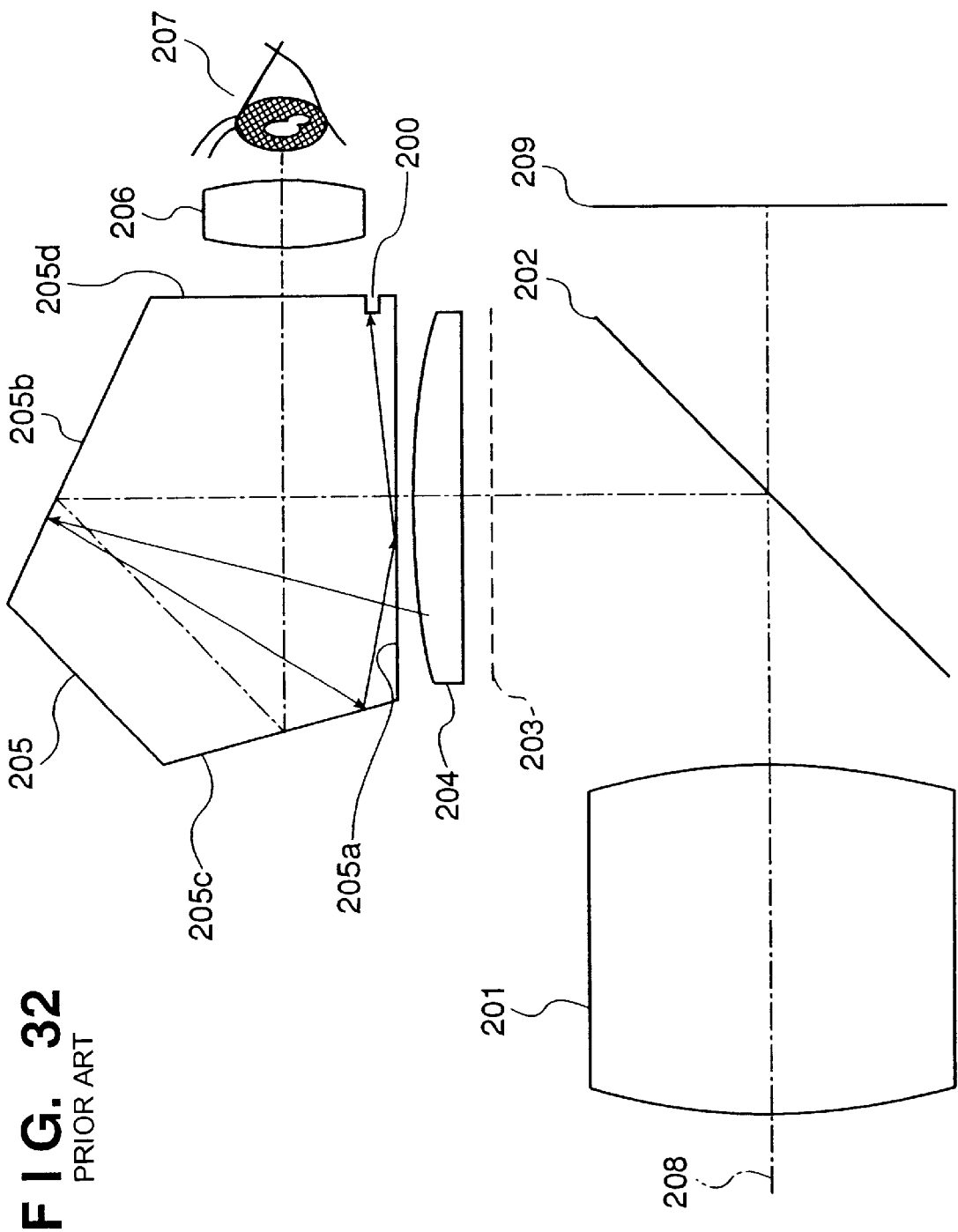
FIG. 32 is an explanatory view of a conventional optical prism.
Figure 33:
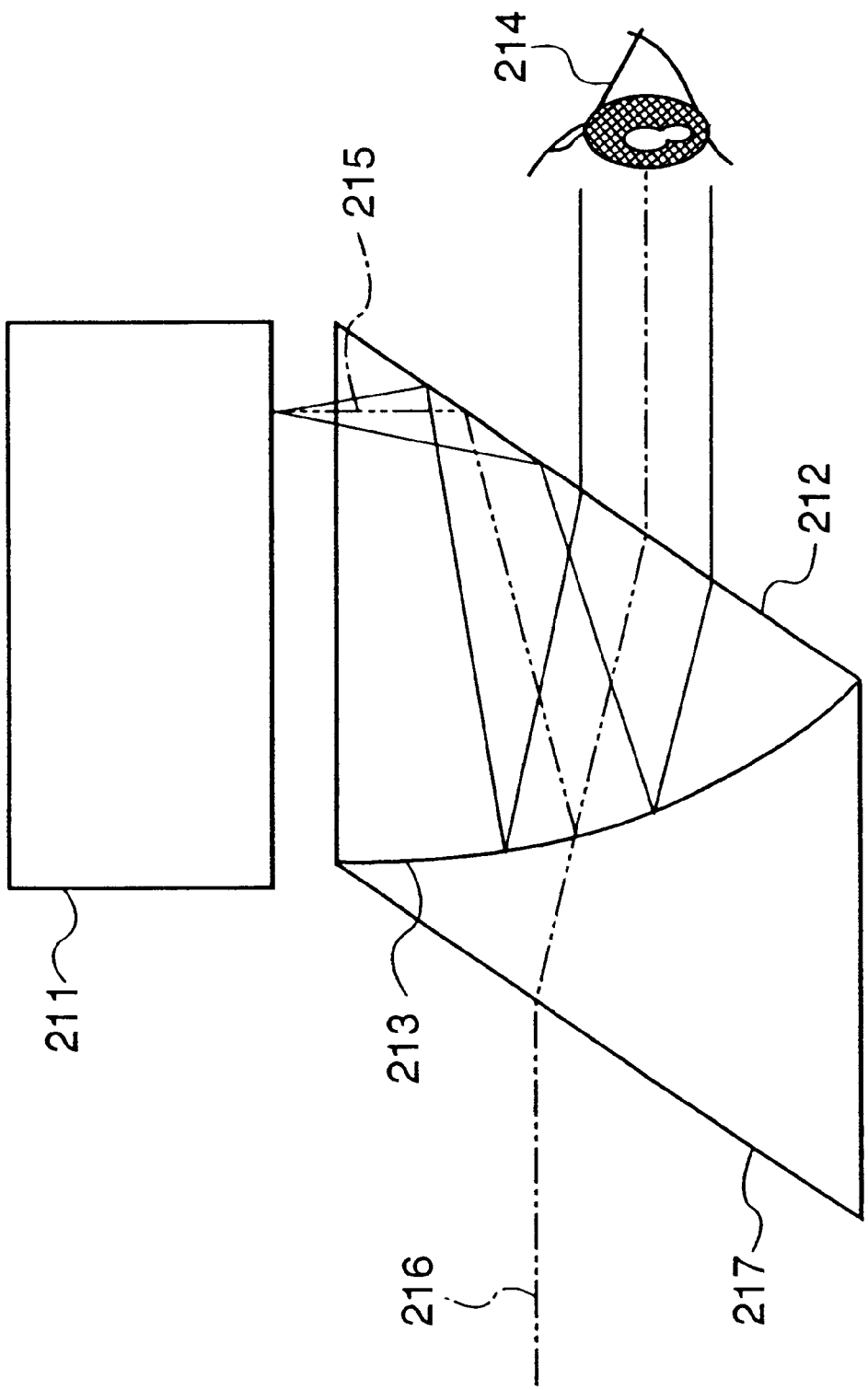
FIG. 33 is an explanatory view of a conventional observation optical system.

FIGS. 26 and 27 are sectional views when the optical element 51 shown in FIG. 19 is viewed from the −Z-axis direction and +Z-axis direction. These sectional views also show the patterns of the effective light ray regions of the respective reflection surfaces.

FIG. 26 is a sectional view when the optical element 51 is viewed from the −Z-axis direction. Referring to FIG. 26, the optical element 51 has the concave refraction surface R2' as an entrance surface, the convex mirror R4', the convex mirror R6', and the convex refraction surface R8 as an exit surface, which are formed adjacent to each other.

FIG. 27 is a sectional view when the optical element 51 is viewed from the +Z-axis direction. Referring to FIG. 27, the optical element 51 has the concave mirrors R3', R5', and R7 which are formed adjacent to each other.

Upon examination of the neighboring portions of the concave mirrors R3' and R5' in FIG. 27, the effective light ray region of the concave mirror R3' has a trapezoidal shape, and that of the concave mirror R5' has a circular shape.

By contrast, since the respective reflection surfaces of the optical element 51 have rectangular shapes in terms of their construction, as shown in FIG. 27, when a reflection film is formed on the entire reflection surface by deposition, sputtering, dipping, or the like, it must also be formed on a broad region other than the effective light ray regions.

When ghost light produced by the optical element 51 is taken into consideration, it is often produced by incident light coming from positions and angles different from those of effective light rays, and hence, light rays often hit positions outside the effective light ray regions.

When a reflection film is formed on the entire reflection surface, ghost light is highly likely to be produced from a surface portion other than the effective light ray region, and the reflection film deposition region is preferably reduced as much as possible to prevent ghost light.

In this embodiment, a reflection film is formed by deposition, sputtering, dipping, or the like only on each region indicated by the dotted line in FIG. 27 in a pattern nearly equal to the shape of the effective light ray region of each reflection surface to have a predetermined margin from the effective light ray region, thereby preventing ghost light from being produced by a region other than the effective light ray region.

Also, since an anti-reflection film is formed on the entrance and exit refraction surfaces by deposition, sputtering, dipping, or the like, ghost can be prevented from being produced on all the surfaces that form the optical element.

Furthermore, in this embodiment, a region other than the film formation portions in FIG. 27 is formed as a non-smoothed surface, e.g., diffusion surface. By simultaneously forming this diffusion surface upon forming the reflection surface group, when ghost light produced by a surface portion other than the effective light ray region hits a region other than the film formation portion, the amount of ghost light is reduced by the diffusion effect of the diffusion surface, thereby lowering the ghost light intensity.

FIG. 28 shows numerical data in an actual design example.

To restate, according to the present invention, in an optical element constructed by a first reflection surface block formed by placing a plurality of reflection surfaces having curvatures at neighboring positions, and a second reflection surface block which opposes that reflection surface block and is formed by placing one or a plurality of reflection surfaces having curvatures at neighboring positions, since the first and second reflection surface blocks are formed by a metal mold, the neighboring reflection surfaces of an optical prism having reflection surfaces with curvatures can be prepared as units. In addition, since the reflection surface blocks are formed by the metal mold, the respective reflection surfaces, which require highest precision, can be prevented from decentering relative to each other, thus avoiding deterioration of optical performance.

Also, in the present invention, since one or a plurality of reflection surface blocks, which do not oppose the first and second reflection surface blocks, are disposed next to the first and second surface blocks, the directions of light rays that enter and leave the optical element can be arbitrarily set. When an optical member having a refraction effect is placed next to the reflection surface block, the degree of freedom in aberration correction of the optical element can be increased, thus improving the imaging performance of the optical element. Furthermore, in the present invention, by integrally forming a plurality of reflection surface blocks using a metal mold, high positional precision of the individual reflection surfaces in the optical element can be assured.

In the present invention, since members for coupling or joining a plurality of reflection surface blocks are provided to predetermined positions of the individual reflection surface blocks, and the optical element is constructed by coupling or joining the plurality of reflection surface block, the manufacture of the respective reflection surface blocks is facilitated, and the reflection surface blocks can be accurately placed at predetermined positions having a predetermined spacing therebetween.

Since the members for coupling or joining a plurality of reflection surface blocks are coupled or joined in regions outside the range of effective light rays, the effective light rays in the optical element can be prevented from being eclipsed.

Moreover, in the present invention, since a holding portion for fixing the optical element to a member to which the optical member is to be fixed or a hole used for moving or fixing the optical element is formed on a portion other than the effective light ray region of the refection surface block, the number of parts can be reduced, and errors produced upon movement of the optical element can be suppressed. In addition, effective light rays in the optical element can be prevented from being eclipsed.

Furthermore, in the present invention, since a metal mold used for forming the reflection surface block adopts one of a metal mold unit divided in units of reflection surfaces, a metal mold unit which forms neighboring reflection surfaces by a single, continuous surface, or a metal mold unit which forms a plurality of reflection surfaces and a neighboring portion that neighbors the plurality of reflection surfaces on a single metal mold, molding can be done irrespective of the shape of the optical element, and the reflection surfaces can be formed at accurate positions. Also, a low-cost optical element can be obtained.

In addition, when portions other than effective light ray regions of the reflection surface block and optical member with the refraction effect in the metal mold are subjected to a light-shielding process, an optical element which suffers less ghost can be obtained.

The present invention is not limited to the above embodiments and various changes and modifications can be made within the spirit and scope of the present invention. Therefore, to apprise the public of the scope of the present invention the following claims are made.

What is claimed is:

1. A method for forming an optical element by using a metal mold which compensates for relative positions of plural reflection surfaces, said method comprising the steps of:

forming on a transparent member a first reflection surface group, comprising a plurality of reflection surfaces each having different curvature and arrayed in a predetermined direction, and a second reflection surface group, which opposes said first reflection surface group and comprises a plurality of optical surfaces including at least one reflection surface, each having different curvature and arrayed in the predetermined direction, wherein said plurality of reflection surfaces of said first reflection surface group and said at least one reflection surface of said second reflection surface group are integrally molded by a metal mold having shapes each corresponding to each shape of said reflection surfaces.

2. A method according to claim 1, wherein one or a plurality of reflection surface groups, which do not oppose said first and second reflection surface groups, are placed on the surface of said transparent member next to said first and second reflection surface groups.

3. A method according to claim 1, wherein refraction surfaces for making light enter and leave said optical element are formed on the surface of said transparent member.

4. A method according to claim 1, wherein a holding portion for fixing said optical element to a member to which said optical element is to be fixed is formed on said optical element, and wherein the metal mold compensates for the relative positions of said plurality of reflection surfaces of said first reflection surface group and said at least one reflection surface of said second reflection surface group and said holding portion.

5. A method according to claim 4, wherein said holding portion is formed on a portion other than effective light ray portions of the reflection surfaces.

6. A method according to claim 1, wherein a hole for moving or fixing said optical element is formed in said optical element.

7. A method according to claim 6, wherein said hole is formed on portions other than effective light ray portions of the reflection surfaces.

8. A method according to claim 1, wherein said metal mold is constructed by metal mold units divided in units of the respective reflection surfaces of said first and second reflection surface groups and refraction surfaces, and said optical element is formed by said metal mold.

9. A method according to claim 1, wherein said metal mold forms the neighboring reflection surfaces of each of said first and second reflection surface groups by a single, continuous surface, and said optical element is formed by combining that metal mold and another metal mold.

10. A method according to claim 1, wherein said metal mold has the plurality of reflection surfaces and a neighboring portion which neighbors the plurality of reflection surfaces, and said optical element is formed by that metal mold.

11. A method according to claim 1, wherein said metal mold is subjected to a light-shielding process on a portion other than an effective light ray portion corresponding to each of said first and second reflection surface groups.

12. A method according to claim 1, wherein said metal mold is constructed by a plurality of mirror surfaces each having a rectangular shape of an arbitrary size, irrespective of circular and polygonal shapes and effective range sizes of effective light ray portions of said first and second reflection surface groups.

13. A method according to claim 1, wherein said plurality of reflection surfaces of said first reflection surface group includes neighboring reflection surfaces neighboring each other, wherein said metal mold adjusts sizes of the neighboring reflection surfaces by broadening mirror surface portions irrespective of a size difference of effective light ray ranges of the neighboring reflection surfaces.

* * * * *